United States Patent [19]

Wilcox et al.

[11] Patent Number: 5,344,322

[45] Date of Patent: Sep. 6, 1994

[54] CRAFT ART SYSTEM FOR FORMING THREE-DIMENSIONAL BEAD MATRIX DESIGNS AND METHOD THEREFOR

[75] Inventors: Reed N. Wilcox, Littleton; Richard L. George, Englewood; William K. Thiess, Aurora, all of Colo.; John T. Loftus, Jr., Milton; Timothy F. O'Meara, Somerville, both of Mass.; William H. Lichfield, Corinne, Utah

[73] Assignee: The Flagship Group II, Inc., Englewood, Colo.

[21] Appl. No.: 43,467

[22] Filed: Apr. 2, 1993

Related U.S. Application Data

[63] Continuation-in-part of Ser. No. 887,289, May 22, 1992, Pat. No. 5,209,663.

[51] Int. Cl.$^5$ .............................................. G09B 11/10
[52] U.S. Cl. .................................. 434/84; 434/81
[58] Field of Search ................ 434/84, 81, 95, 85, 434/96, 98

[56] References Cited

U.S. PATENT DOCUMENTS

| | | | |
|---|---|---|---|
| Re. 31,240 | 5/1983 | Mabry et al. | 112/439 |
| 3,240,176 | 3/1966 | Morrison . | |
| 3,819,445 | 6/1974 | Devries . | |
| 3,972,284 | 8/1976 | Bell . | |
| 3,979,844 | 9/1976 | Smith . | |
| 4,075,962 | 2/1978 | Mabry . | |
| 4,189,857 | 2/1980 | Fujisawa . | |
| 4,239,011 | 12/1980 | Schultz . | |
| 4,310,313 | 1/1982 | Brundige . | |
| 4,495,230 | 1/1985 | Ellwein . | |
| 4,496,510 | 1/1985 | Hanson et al. . | |
| 4,836,381 | 6/1989 | Edwards et al. . | |
| 4,953,370 | 9/1990 | Hambright . | |
| 4,963,407 | 10/1990 | Detweiler et al. . | |
| 5,106,305 | 4/1992 | Grant . | |
| 5,209,663 | 5/1993 | Wilcox et al. | 434/84 |

OTHER PUBLICATIONS

Country Cradle Brochure, County Cross-Stitch, Inc., Joyce C. Bailey, 1979.
"Sweatshirt Stitchin'", Banar Designs, CL-86, 1988 Banar Designs.
Delta Technical Coatings, Inc. advertisement.
Lee Riggins-Hartman, "Our Wedding", Bridal Crafts, Summer 1992.

*Primary Examiner*—Gene Mancene
*Assistant Examiner*—Jeffrey A. Smith
*Attorney, Agent, or Firm*—Dorr, Carson, Sloan & Peterson

[57] ABSTRACT

A craft art form product, system and method including patterns, paint, and applicators enables craft paint to form three-dimensional color bead matrix patterns having high degree of visual resolution and color saturation. Precisely located and closely spaced geometric shapes associated with a set of color symbols are used to form matrix designs in patterns. Each symbol represents an artistic expression which is assigned to a particular color. Each color symbol has a color darkness value which may also correspond to the darkness value of the assigned color. The craft paint material has the characteristics of forming a discrete substantially uniform and homogeneous, three-dimensional bead to overlay the color symbol associated with each geometric shape. The craft paint material can form discrete beads placed closely together without running together, yet retain sufficient fluidity to settle into smooth, substantially uniform beads. A fine tip applicator applies the craft paint material to each geometric shape.

34 Claims, 19 Drawing Sheets

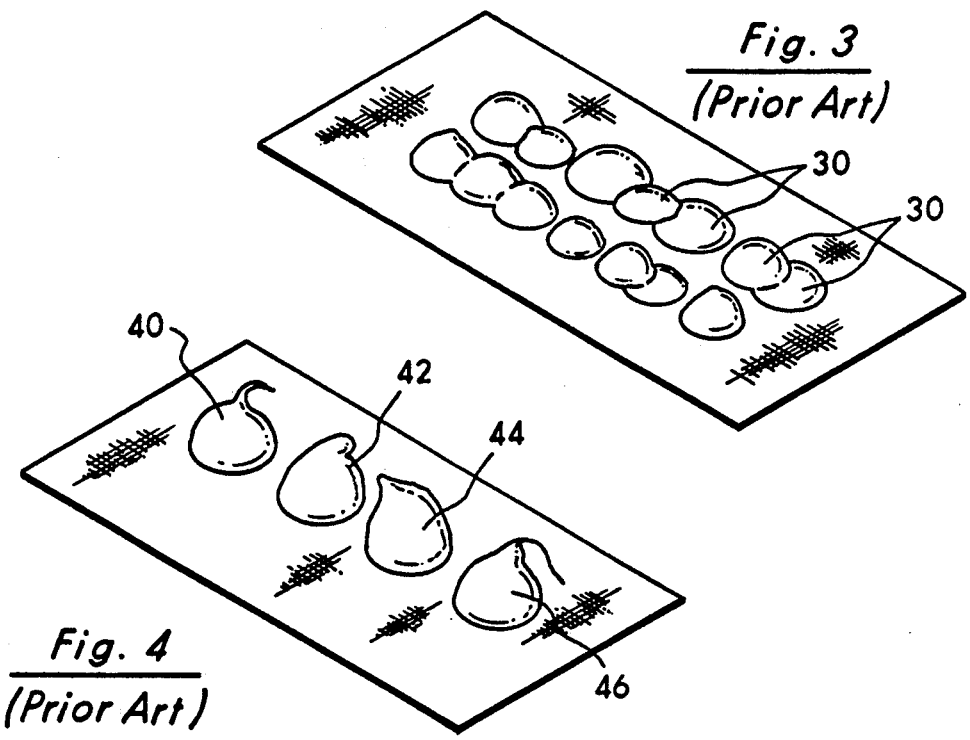
Fig. 3 (Prior Art)
Fig. 4 (Prior Art)
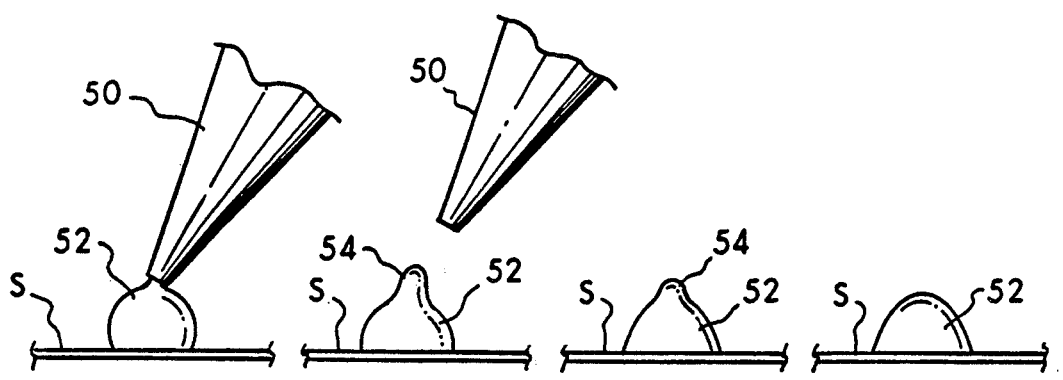
Fig. 5(a)   Fig. 5(b)   Fig. 5(c)   Fig. 5(d)
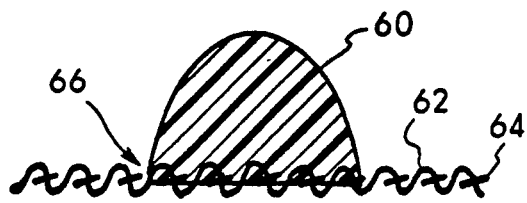
Fig. 6
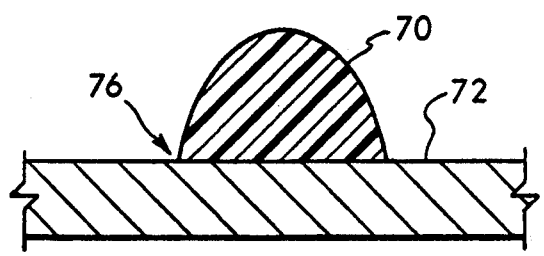
Fig. 7

Fig. 12

- 80 — ⓥ Light Pink
- 84 — ⊖ Rose Petal
- ⊕ Strawberry
- ◐ Cranberry

- ⊗ Poppy Red

86 {
- ⊘ Lemon Yellow
- ⊕ Sunflower
- ③ Buttercup
- ⊤ Tangerine
}

- ① Ivory
- ○ Snow White

- Ⓢ Slate
- ◐ Pewter
- ● Black

- ⊛ Butterscotch
- ⊘ Toffee
- ⊖ Mocha
- ◐ Cocoa

- ◔ Lilac
- ⏶ Deep Lilac
- ◐ Periwinkle

- ◐ Baby Blue
- ⓪ Light Wedgewood
- ⓐ Wedgewood
- ◖ Cornflower
- ⓟ Royal Blue
- Ⓝ Navy Blue 88 {
- ⓠ Spring Green
- ⊕ Celery
- ▲ Avocado
- ⊕ Bright Green
- ⊖ Forest Green
}

- ▽ Light Turquoise
- ⊕ Turquoise

- ✪ Gold
- ⓐ Antique Gold
- ⓥ Copper

- ◡ Light Beige
- ◐ Peach
- ⓢ Salmon

- ⊗ Dusty Rose
- ⊙ Antique Rose

© 1992 Flagship Group, Inc.

© 1992 Flagship Group, Inc.

Fig. 32
 ← 3200
 ← 3210
 ← 3220
 ← 3230
 ← 3240
 ← 3250
Fig. 33
 ← 3300
 ← 3310
 ← 3320
 ← 3330
 ← 3340
 ← 3350

CRAFT ART SYSTEM FOR FORMING THREE-DIMENSIONAL BEAD MATRIX DESIGNS AND METHOD THEREFOR

RELATED INVENTION

This application is a continuation-in-part of Ser. No. 07/887,289 filed May 22, 1992, now U.S. Pat. No. 5,209,633, entitled Craft paint System for Forming Fine Designs.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

FIELD OF THE INVENTION

The present invention relates to the field of providing stylized decorative designs on surfaces, and particularly to the field of craft paints for forming painted designs with hand-applied, color bead matrix patterns of three-dimensional beads of paint closely spaced together to visually merge to form designs of lines or fields of color.

STATEMENT OF THE PROBLEM

There is great consumer interest in forming decorative designs on surfaces. These surfaces include such application surfaces as fabrics, wood, leather, vinyl, and painted and other surfaces. Conventional decorative designs include needlecraft (such as embroidery) on fabric surfaces, dyeing threads on a fabric surface, and craft painting on a variety of surfaces. Each of these techniques enjoy certain advantages as well as suffer from certain disadvantages.

a. Needlecraft Embroidery

A popular technique for creating a stylized decorative design on fabric surfaces is needlecraft embroidery. Needlecraft embroidery includes needlepoint, candlewicking, embroidery, cross-stitching, etc. Needlepoint stitching is embroidery worked over or on a fabric in simple even stitches across counted threads. Cross-stitching is similar to needlepoint but includes any needlework stitch that forms an "X" or cross. Needlepoint and cross-stitching, historically, are favored by many people since they provide an elegant, fine, textured appearance on textile surfaces, whether the textile surface is in the form of apparel or in an embroidered artwork or craftwork.

Typically, needlepoint consists of 11 to 24 stitches across a corresponding 11 to 14 thread count textile material. Thread counts are defined by the number of threads per inch. Needlepoint and cross-stitching provide a dimensional perspective to the textile surface, particularly when the color of the stitching is varied from the background textile surface and from adjacent stitching. Needlepoint and cross-stitching are usually performed according to a pre-designed pattern which serves as a guide for forming the final needlecraft design. The pattern is generally laid out in a grid array of squares with the squares appropriately marked according to the particular color, thread or stitch to be used. The threads on the textile surface are counted according to the pattern and the appropriate stitch is applied. Needlepoint and cross-stitching according to the pattern provides an appearance exhibiting texture and structure so as to create an elegant colored impression on the textile background. The skill necessary to perform needlecraft can usually be acquired with repetition. Little creativity is required for needlecraft since the design is applied according to a selected pattern.

However, needlecraft is intensively time-consuming and laborious. A typical needlecraft pattern may require from ten hours to over a hundred hours to finish. Additionally, needlepoint is generally limited to a finite number of available patterns. The patterns used in needlecraft are generally expensive to create and also difficult to reproduce onto the textile surface. The use of these patterns limits expressions of individual creativity. The range of textile materials on which needlecraft can be applied is also limited to textile materials having a thread count in the range of approximately 11 to 24. This count range is necessary to provide a sufficient substrate for the needlepoint and cross-stitch stitches.

Thus, while needlecraft provides an elegant colored appearance on fabrics with only a minimal amount of skill, the disadvantages associated with needlecraft limit the use of needlecraft. These disadvantages include a limited number of surfaces on which needlecraft can be applied and, in particular, the amount of time necessary to create a needlecraft design.

b. Thread Dyeing

Another technique for creating a design on a fabric surface is by dyeing individual threads on the fabric surface. This technique uses a marking instrument constructed to dye individual yarn loops in an array of loops. Single loops of the material are dyed according to a code on the pattern. The tip of the marking instrument requires a single loop to be received within a recessed loop where the single loop is dyed. This technique is designed to simulate needlepoint by dyeing each thread. This technique is still time-intensive and limited to use on specific materials. The design created by this technique is a flat, two-dimensional, colored design.

c. Craft Painting

Craft paints are widely used since a colorful design can be created in a minimum amount of time on a variety of surfaces. In craft painting, the design is not usually limited to a pattern since normally the design is quickly painted in a free hand style. The free hand style design can thus be creative and colorful.

When no patterns are used in creating a craft painted design, the user must possess some degree of creative ability as well as artistic technique. This intimidates most users from attempting to create a detailed design, especially fine designs. Patterns that have been used with craft paint are tracing patterns, much like children's coloring books. The designs are simply "colored" in by staying within the lines.

A need exists for a new craft that utilizes craft paint to create finely-detailed mosaic patterns or geometric shape matrix designs similar to cross-stitching or needlepoint designs. This new craft requires the craft paint to be formed in stylized, three-dimensional matrix decorative designs of colored geometric shapes for application on a wide variety of surfaces.

i. Problems with adapting prior craft paint to fine three-dimensional designs In order to create a finely detailed, textured appearance such as found in needlecraft, it is necessary that the craft paint, upon application, form discrete, closely spaced beads (i.e. dots or strips) of paint having distinct three-dimensionality. The beads should also be generally uniform and homogenous in shape and size. This is contrary to the qualities of conventional craft paints. Some conventional craft paints fail to form stable, individual, discrete beads of paint. Rather than forming beads, the paint tends to coalesce or run together, especially if spaced more closely together. Other beads formed of conventional paint flatten out on the surface to form dots. Hence, these types of craft paint tend to diffuse into a continuous surface upon application, thus having no discrete height dimensionality, no general uniformity and no general homogeneous shape. Other prior craft paints tend to be so viscous that nonhomogeneous, nonuniform lumps of paint are formed. These lumps tend to have substantial irregular shapes such as tear drops or conical shapes with extended curlicues or strings as the paint is applied. Such beads have irregular shapes that are especially dependent upon the angle and technique of application. Such highly viscous craft paints are unable to achieve finely detailed appearances.

A need exists for a paint system having a craft paint that upon application consistently provides discrete and substantially rounded, uniform, and homogeneous three-dimensional beads (i.e., dots or strips) that can be closely spaced so as to merge visually to form lines or solid fields of color exhibiting a high degree of visual resolution and color saturation. These beads of paint may be circular in shape or be formed in various geometric shapes to simulate stitch patterns.

ii. Problems with applying craft paints to patterns

Another disadvantage in craft painting is the lack of detailed patterns for the application of the design. Normally, the craft paint is applied in a free hand fashion. This allows creativity in applying the design. If patterns are used, the conventional patterns are coarse and without fine detail. Many people lack the skill necessary to create an elegant structured design, especially a design having fine details similar to needlecraft designs.

Needlecraft such as needlepoint or cross-stitching provides users with finely detailed square grid patterns to follow which enable even unskilled people to create fine designs. Needlecraft requires complicated patterns to be created involving coded symbols. These patterns are typically provided on a square grid scale with the different symbols used for different colors of thread in the design. These patterns are then carefully followed by the user as a map to stitch a desired design. Each square represents a stitch and each symbol represents a color. The lines of the grid represent threads in the weave of the fabric and the user must actually count the threads in the fabric corresponding to the grid. This is laborious and time consuming.

The prior needlecraft coding patterns used symbols having a color darkness value to generally indicate the designs on a pattern. The use of such symbols allows the designs to be easily interpreted. However, there is no uniformity in the coding symbols used to identify the colors of each respective pattern. Even the same artist, creating two different patterns, may use different symbols for the same colored thread. This is in part due to the necessity of providing adequate shading on the symbol so that the design is recognizable. This requires both the artist to create, and the user to relearn, a different coding pattern for every design created and used. Also, it is complicated to learn and relearn new codes with each new pattern to match the appropriate color of thread used in a pattern since the codes refer to different shades in each new pattern.

A need therefore exists for craft paint system patterns for use by craft paint users that: provides a coding scheme easily followed by users, provides for many different colors and provides for symbols having color darkness values that correspond to the darkness values of the paint colors used or to an assigned color.

iii. Problems with prior craft paint applicators

The prior craft paint applicators generally either have a relatively large conical applicator tip or a long tubular applicator tip. Neither tip is suited for fine application of craft paint. Each of these prior craft paint applicator tips have problems associated therewith.

The conical applicator tips are adequate for use in forming continuous lines. These applicator tips are cut off to allow paint to be dispensed. The tips are often cut off unevenly which affects the amount of paint flow being dispensed. Paint residue in such tips will dry and may create obstructions which detrimentally affects consistent application of the paint. Also, conical tips have relatively thick sidewalls which cause the paint to be applied in larger diameter flows. The craft paint application tends to be in a relatively large, turbulent flow which is satisfactory for gross free hand application but is not suited for fine, controlled application. Also, the relatively large size of the conical tips tend to obscure the line of sight of the craft paint application.

Tubular tips are finer and provide an improved line of sight. Tubular tips, however, have high flow resistance due to the shear forces incurred by the paint flow through the long tubular orifice of the applicator tip. This detrimentally affects the characteristics of the craft paint as well as increases the pressure necessary to force the craft paint through the applicator, thereby causing hand fatigue. Also, tubular tips tend to be susceptible to clogging.

A common problem occurs in the use of either of the conventional types of applicator tips discussed above. Air bubbles are formed in the conventional applicators by the movement of air pockets through the craft paint as the applicator is inverted. These air bubbles then disrupt the flow of the craft paint. This disruption causes the flow to become turbulent within the applicator tip. Moreover, the air bubbles will "spit" or "pop" as the craft paint flows out of the applicator tip and on to the application surface. The uniformity of the craft paint beads is greatly affected by these air bubbles.

A need therefore exists for a craft paint system having a fine applicator tip (i.e., an outside diameter less than about 0.060 inches) and thin sidewalls (i.e., less than about 0.015 inches in thickness). A need exists for a tip which is not susceptible to clogging and which provides a clear line-of-sight. A need exists for a tip that substantially eliminates turbulence and which minimizes shear so that less hand fatigue is encountered in the application of the paint. Finally, a need exists for a craft paint system capable of minimizing the formation of air bubbles in the craft paint flow in order to reduce the disruption of designs and to reduce turbulence in the craft paint flow.

DISCUSSION OF PRIOR ART

One prior art attempt to create a dyed color matrix decorative design is disclosed in U.S. Pat. No. 4,953,370, issued to Hambright. This patent discloses a technique of thread-dyeing, discussed above. This particular technique uses a cut-out frame on which a special fabric is mounted. The individual loops of yarn of this fabric are then dyed to match a pattern code. The dyeing technique uses a special marking instrument which has a recessed nib. The individual loops of yarn are each inserted into the recessed nib. A marking tip contacts the individual loop of yarn in the nib to dye that particular loop. This technique is relatively time-intensive and limited to use on specific materials. The design created by this technique is a flat, two-dimensional, colored design.

SOLUTION TO THE PROBLEM

The present invention provides novel solutions to the above identified problems as well as creating an entirely new craft art form. A new craft art form and system is created which enables a novel craft paint and applicator to be utilized to form, quickly and easily, fine three-dimensional color bead matrix design work similar to needlecraft. This formation occurs without the lengthy time periods needed to create needlecraft and without the artistic ability generally necessary to properly use craft paint in a free hand style.

To overcome the problems associated with the above prior art approaches and in order to create a new craft paint art form, the system of the present invention, in a first embodiment, utilizes individually designed color-coded geometric shapes formed in matrix patterns. These patterns are made up of precisely located geometric shapes (such as circles or stitch configurations) having a preferred density of shapes per inch wherein the shapes are spaced closely together within a predetermined distance to form matrix designs in patterns. Unlike needlecraft grids of adjacent, contiguous squares, the geometric shapes of the present invention do not touch each other. The shapes of the present matrix patterns are not limited to a perpendicular grid array, so that the present invention can use shapes in curvilinear relationships and in nested arrays. The latter two formats allow artists creating designs for patterns of the present invention to have significantly more freedom in creating fine elegant designs than heretofore presented by needlecraft patterns.

In another preferred embodiment of the invention, a standard set of color symbols created under the teachings of the present invention provides universality to the new art form. Only one set of color symbols is memorized either by the artist creating the designs or by the users in painting the designs. This greatly simplifies the process of creating patterns for new designs and the painting of these patterns by the user. This of significantly advantageous when compared to needlecraft wherein not only do color symbols for the grids vary from artist to artist but even the same artist may use different color symbols in his or her designs. Each symbol in the standard set of symbols of the present invention represents an artistic expression which is permanently assigned to a particular color. In this form of the invention based upon a standard set of color symbols, the craft paint can be sold in applicator bottles utilizing the color symbols on the bottles or on the packaging associated therewith. This greatly simplifies the use of the craft paint system of the present invention by the user. In other words, the craft painting system of the present invention provides a format for the user to accurately recreate the intended effect by the artist of the design. The color symbols are placed on, within, or near each shape of the pattern. This embodiment is optional since, the color codes may simply correspond to a desired color such as is typically found in conventional needlecraft designs without regard to providing a universal code.

In another preferred embodiment, each color symbol has a color darkness value which corresponds to the darkness value of the assigned color. Hence, a darker green would have a symbol with a darker value than the symbol for a light green or even a symbol for a light pink. The color symbols of the present invention, when used by the artist creating the design in the patterns, provide a pattern that the user can view to quickly perceive the design (in black and white shades). In addition to the darkness value corresponding to the darkness value of each assigned color, the shades of a particular color (i.e., the shades of green) use color symbols with distinctly different expressions. This is an important feature of this embodiment of the present invention in that the user, when painting the design, becomes quickly aware that a new shade of a particular color is being utilized. This embodiment is optional since, the color codes may simply correspond to a desired color such as is typically found in conventional needlecraft designs without regard to darkness value.

Another aspect of the present invention is the composition of the craft paint and the characteristics of the applicator tip. The craft paint of the present invention has the characteristic of forming a discrete and substantially uniform and homogeneous bead (i.e. a dot or a strip) to overlay the color symbol in association with the geometric shape. For example, the applied bead of paint covers a dot such as a circle. The bead of paint provides a height dimension to the final design which more closely corresponds to some form of needlecraft work with upstanding threads (e.g., needlepoint) than to craft paint work wherein the craft paint lies in contour lines of color upon the surface. The craft paint of the present invention can quite easily be applied so that it stays within the confines of the geometric shape. The craft paint does not tend to run or bleed outwardly after application. Additionally, the craft paint is not so viscous that curlicues or strings are formed. Rather, upon application, the craft paint beads so as to form a smooth rounded upper surface despite various angles of application. The paint can be applied to most surfaces such as fabric, paint, wood, leather, etc. Hence, the paint of the present invention, when applied to the color coded shapes, provides a dimensional or textured look to the artist's design. High color saturation or color brilliance is achieved by the visual density or close proximity to the beads and by the height dimension.

In order to effectively apply craft paint of the present invention to the symbol coded shapes of the present invention, a fine tip applicator was optionally created to apply the paint to each shape such as the center of each circle. The paint is applied in a smooth laminar flow without turbulence so as to ensure the uniformity and homogeneity of each bead. The applicator of the present invention optionally uses a fine tip having a dispensing dimension much finer than that found in conventional craft paint applicators.

The craft paint system also optionally includes a cap which serves as a base for holding the craft paint applicator in an inverted position. This inverted position keeps the craft paint in fluid contact with the inner walls of the applicator tip. The inverted position also keeps any air pockets away from the applicator tip to minimize the formation of air bubbles.

Hence, the new craft paint art form and system of the present invention in its various embodiments and optional features overcomes all of the above problems and provides significant other advantages that have resulted in an entirely new craft art form. While similar in some aspects to the textured effect created by needlecraft, the system is approximately ten times faster to apply, can be used with a much broader range of fabrics, and significantly expands upon the design possibilities over needlecraft. The craft paint system of the present invention, for the first time, enables consumers who are adept at fine needlecraft work, but lacking the artistic skills associated with free style craft paint, to create a three-dimensional color design based upon the pattern of geometric shapes. Images are formed by discrete colored beads of craft paint spaced closely together to merge visually together into solid lines or fields of color having a high degree of resolution and color saturation, especially when the shapes are in the form of conventional stitches.

These and other features of the present invention will be evident in the ensuing drawings and description.

SUMMARY OF THE INVENTION

A novel craft art form and system is created which enables a novel craft paint to be utilized in a fine three-dimensional color matrix design of geometric shapes such as a circle or a stitch having a high degree of visual resolution and color saturation without the lengthy time periods needed to create prior art matrix pattern designs such as needlecraft and without the artistic ability generally necessary to properly use craft paint in a free hand style.

The system of the present invention preferably utilizes a uniquely formulated beading craft paint. The uniquely formulated craft paint has special flow and beading characteristics that form beads precisely positioned on precisely located shapes having preferred densities wherein each shape is closely spaced by a predetermined distance to form designs in patterns. The present invention uses shapes in straight and curvilinear lines and in regular and nested arrays. The beads of paint are discrete and are of substantial uniform and homogeneous shape so as to visually merge together and to create sufficient color density so as to insure perception of the intended pattern. The craft paint is sufficiently fluid to form a substantially rounded bead which is stable enough so as not to collapse or run together when positioned in fluid beads of the same size.

In one form of the invention, a standard set of color symbols created under the teachings of the present invention provides universality to the new art form of the present invention. Only one set of color symbols ever needs to be memorized either by the artist creating the designs or by the users in painting the designs. Each symbol in the standard set of symbols of the present invention represents an artistic expression which is permanently assigned to a particular color. Each color symbol has a darkness value which corresponds to the representative darkness value of the assigned color. Hence, the color symbols of the present invention, when used by the artist creating the designs in the patterns, provide a pattern that the user can view to quickly perceive the design (in black and white shades). In addition to the darkness value corresponding to the darkness value of each assigned color, the shades of a particular color use color symbols with distinctly different designs. In another form of the invention, the codes are assigned to a specific color without regard to darkness value.

By providing a standard set of color symbols in one form of the present invention, the craft paint can be sold in applicator bottles utilizing the color symbols on the bottles or on the packaging associated therewith. This greatly simplifies the use of the craft paint system of the present invention by the user. The craft painting system of the present invention provides a format for the user to recreate precisely the intended color effect by the artist of the design.

The craft paint of the present invention has the characteristics of forming a discrete and substantial uniform and homogeneous bead to overlay the color symbol on, within, or near the shape. The applied bead of paint covers the shape and the symbol so the coding pattern is no longer visible. The craft paint also provides a substantially hemispherical bead of paint when the shape is a circle. Upon application, the craft paint beads so as to form a smooth rounded upper surface despite various angles of application. These beads can be placed very closely together without running together, yet retain the ability for individual beads to coalesce into a smooth, rounded, substantially uniform bead. The preferred paint of the present invention, when applied to the color coded circles, provides a textured look to the artist's design having a high degree of visual resolution and color saturation.

In order to effectively apply craft paint of the present invention to the symbol coded shapes of the present invention, a fine tip applicator was created, in one form of the invention, to apply the paint to the shape. The paint is finely applied in a laminar fashion without turbulence so as to ensure the uniformity and homogeneity of each bead. The applicator of the present invention uses a fine tip in this embodiment having a dispensing dimension much finer than that found in conventional craft paint applicators.

The applicator system, in another form of the invention, also includes a holder for storing the applicator in an inverted position. This inverted position keeps the craft paint in fluid contact with the inner walls of the applicator tip thus substantially reducing tip clogging due to drying of paint in the tip. The inverted position also keeps any air pockets away from the applicator tip so that air bubbles are minimized. The craft paint flow is thus not disrupted by air bubbles in the applicator tip.

The system of the present invention in its several embodiments allows a user to create color matrix patterns formed of three-dimensional, substantially uniform beads that visually merge to form lines or fields of color having a high degree of visual resolution and color saturation.

BRIEF DESCRIPTION OF THE DRAWINGS

FIG. 3 illustrates the creation of irregularly shaped, substantially flat dots which have run together, such as are created by many prior art paints.

FIG. 4 illustrates three-dimensional irregularly shaped beads having substantial curlicues and strings created by other types of prior art paint.

FIG. 5(a)–5(d) sets forth the steps which occur in the creation of the smooth homogeneous bead of the present invention.

FIG. 6 is a cross section of a discrete uniform, homogeneously shaped bead of the present invention engaging the fabric surface.

FIG. 7 is a cross section of a discrete uniform, homogeneously shaped bead of the present invention on a rigid surface.

FIG. 12 sets forth the color symbols used under the teachings of the present invention.

FIGS. 32 and 33 illustrate the application of color codes to the open geometric shapes of FIGS. 20 through 27.

DETAILED DESCRIPTION OF THE PREFERRED EMBODIMENT

General Overview

The present invention provides a craft art system for quickly and easily creating stylized three-dimensional color dot matrix designs having a depth of perception and a high degree of visual resolution and color saturation. Using this system, attractive designs can be completed at a rate of several minutes per square inch, compared to at least many minutes per square inch for prior art matrix pattern crafts, such as needlepoint or cross-stitch (e.g., 3 minutes versus 30 minutes per square inch). An element of height on the design elements is necessary to create the perception of a structured, textured look rather than a flat two-dimensional appearance. The craft art system does so by providing a plurality of components that combine to allow the creation of discrete and substantially uniform, three-dimensional beads precisely spaced to form a color dot matrix pattern. The pattern is formed by positioning substantially smooth rounded beads of craft paint closely together which visually merge to create an appearance of solid lines or fields of color having a high degree of visual resolution and color saturation.

One feature of the system is the ability to create discrete beads of craft paint. These beads are spaced closely together (4–9 beads per inch), yet do not run together. The beads retain enough fluidity so that the individual beads still coalesce into smooth rounded shapes. If the beads run together, the attractiveness of the design is lost, the features of the design are blurred, and the appearance of dimensionality is lost. If the beads are substantially nonuniform in size, shape or spacing, the patterned look is lost. This is analogous to a forest and trees example. If the trees in the forest are all uniformly spaced and sized, then an observer from above will see a textured pattern formed by the trees (i.e., sees the forest). However, if some trees are different in size than the surrounding trees or have different spacing, the observer will focus on the individual trees.

Figure 1:
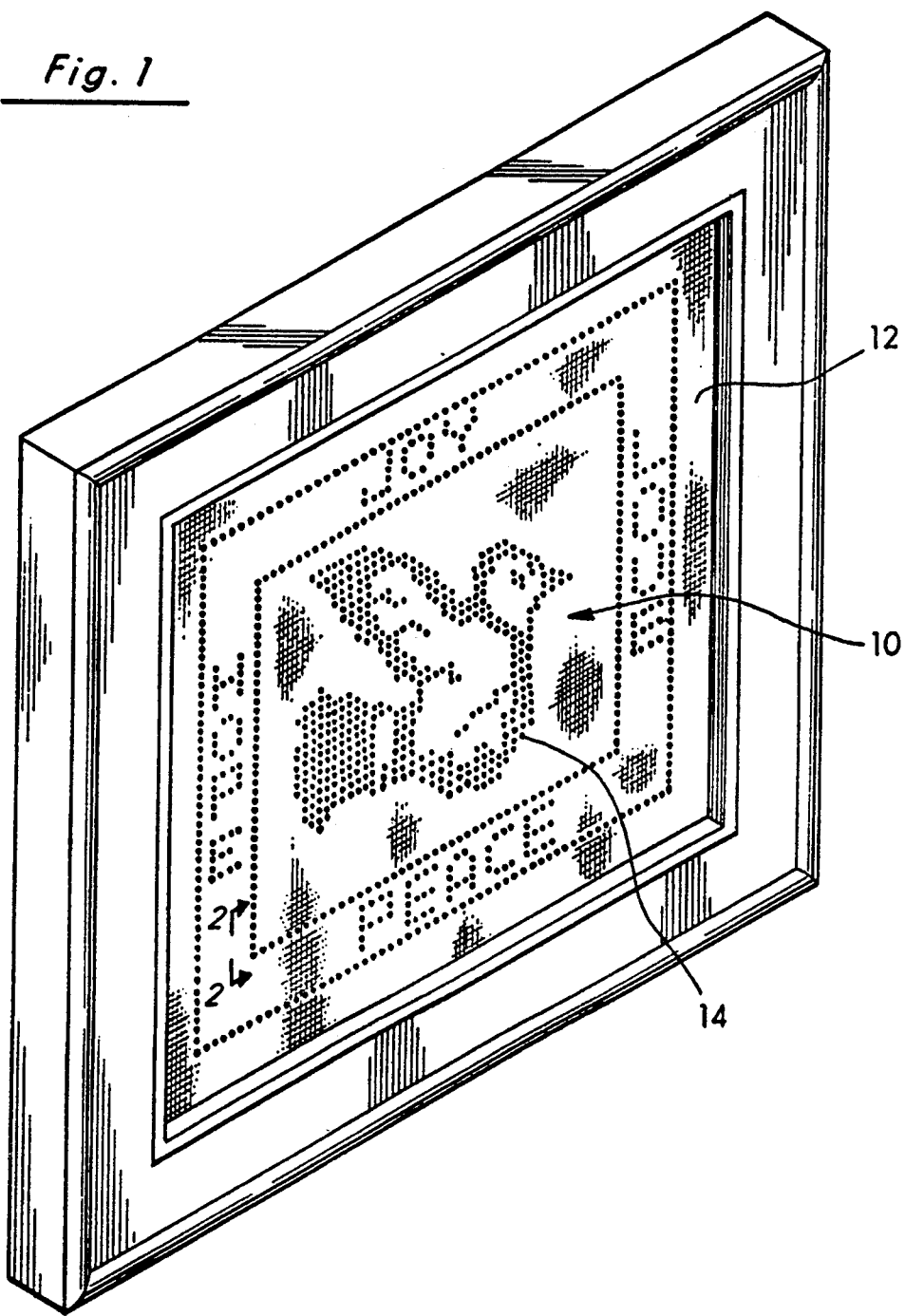
FIG. 1 sets forth an illustration of a pattern containing a three-dimensional design created by the craft paint system of the present invention.

The system of the present invention allows a user to create a stylized three-dimensional color dot matrix design having a patterned textured appearance with a high degree of visual resolution, such as design 10 in FIG. 1. Design 10 includes a plurality of discrete beads 14 affixed onto a surface 12. While the surface 12 is indicated as fabric in FIG. 1, the design can be created on a wide variety of surfaces, including leather, vinyl, wood, painted and other surfaces. Needlecraft is well suited for special fabric having 11 to 24 thread counts per linear inch. Such special fabric is typically used for wall hangings or appliques, but is not well suited for application to normal fabrics used for most home decor items or clothing. Most fabrics, designed for everyday use, have thread counts much too high for use with needlepoint or cross-stitch. In contrast, the coded pattern of the present invention can be easily transferred to virtually any fabric used for clothing or home decor items.

Figure 2A:
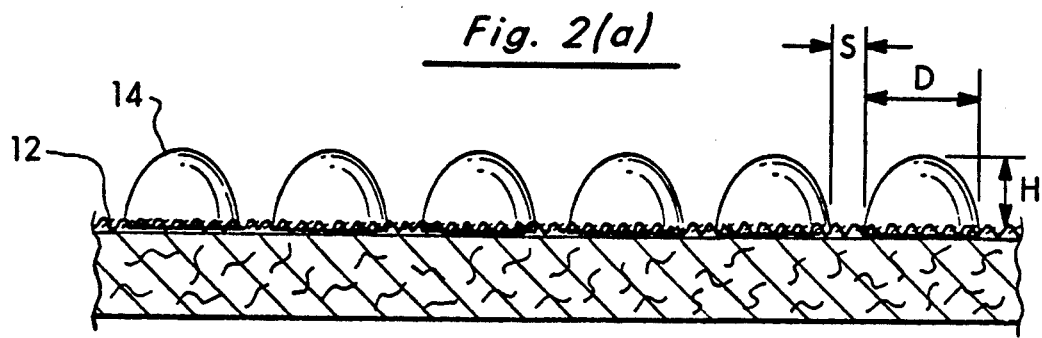
FIG. 2(a) sets forth a side view illustration of a plurality of discrete uniform, homogeneous three-dimensional beads created by the craft paint system of the present invention.
Figure 2B:
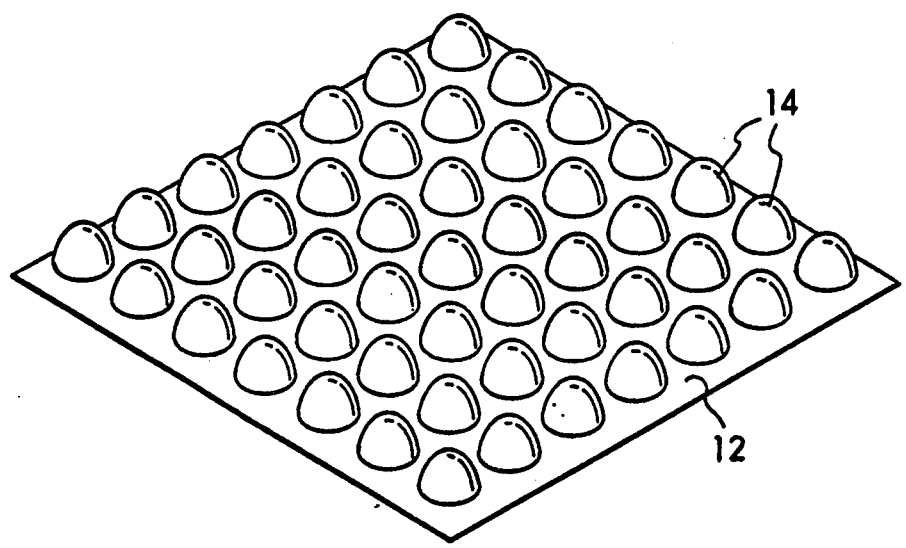
FIG. 2(b) sets forth a perspective view illustration of the beads illustrated in FIG. 2(a).

As illustrated in FIGS. 2(a) and 2(b), design 10 is created by discrete and generally uniformly sized and spaced beads 14. Each of the beads 14 have a substantially uniform homogenous shape, as shown in FIG. 2(a) and 2(b), to provide a three-dimensional, textured appearance. The term "uniform" as used herein refers to beads 14 having the substantially same smooth rounded shape. Each bead 14 has a height "H", a diameter "D" and a spacing "S". The height H is substantially the same as adjacent beads and is generally in a desired range of permitted variation. The term "homogeneous" as used herein refers to beads of generally the same dimension (i.e., H and D). The term "spaced" refers to the spacing S. The term "discrete" refers to the physical integrity of each bead without touching or blending with another bead. It is to be expressly understood that the beads vary in dimension from individual application to individual application, but conform to the aforesaid designed characteristics.

The system of the present invention may combine all of the different embodiments to create designs 10 by using several components such as: craft paint having distinctive beading and flow characteristics, a universal color coding scheme with color darkness values, a fine tipped applicator for applying the craft in small, discrete beads not susceptible to disruptions in the craft paint flow on the pattern, and a holder for storing the applicator in an inverted position to minimize the formation of air bubbles in the craft paint flow. Or, the system, the pattern, the kit, the product, or the process of the present invention may use one of more of the various embodiments set forth above or in the following and as claimed herein.

The craft paint of the present invention provides a discrete bead 14 forming a rounded, smooth shape with substantial regularity. The craft paint of the present invention stabilizes without interfering with adjacent beads while remaining fluid enough to form discrete substantially uniform and homogenous three-dimensional beads.

The coding pattern of the present invention provides a transfer surface having an array of circles, in the embodiment of FIG. 2, to form a desired design in the pattern. The arrayed circles are precisely sized and spaced to provide the desired color saturation for the design. The use of geometric shapes such as circles rather than squares is unique. It provides a guide or target for application of the beads of paint. It also allows the beads 14 to be applied in a smooth curved pattern rather than the traditional stair step pattern of needlecraft. The need for a needlecraft-type grid is eliminated.

An important feature of the coding pattern, in one embodiment, is the use of a set of color symbols. Individual color symbols are displayed within each circle of the pattern to identify the appropriate color to be applied for the desired design. The symbols may have color darkness values corresponding to the darkness values of the assigned colors.

The craft paint is applied onto the coding pattern by a fine-tipped applicator of the present invention. The applicator provides a fine tip to improve the line of sight for applying the craft paint onto the coding pattern. The fine-tip is designed to provide a smooth laminar flow without being susceptible to clogging. The holder stores the applicator in an inverted position so the applicator is not susceptible to air bubbles in the paint flow. The applicator is designed so the designs can be quickly and easily created with little hand fatigue.

Each of these system components is discussed in detail below. The system of the present invention provides an efficient process for creating stylized three-dimensional color dot matrix designs. Taken together, the components of the system will permit design completion at a rate of several minutes per square inch compared to at least an order of magnitude in minutes per square inch more for traditional needlecrafts such as cross-stitch or needlepoint. The efficiency of the process is important in allowing a sense of accomplishment and aesthetic pleasure in seeing the design take shape.

Craft Paint

Beads created by prior art craft paints are illustrated in FIGS. 3 and 4. Typically prior art craft paints tend to be of two general types. As shown in FIG. 3, some prior art craft paints create beads 30 which tend to run together and, thereby, lose the "discrete" bead quality depicted in FIG. 2 as well as the "uniform" shape and size. The results of using the second type of prior art craft paints are shown in FIG. 4. These paints are too viscous. Therefore, the beads 40, 42, 44, 46, created by these high viscous paints tend to form beads with non-homogeneous, nonhemispherical shapes. In general the beads created by such viscous paints form shapes such as tear drops 42, 44 or conical shapes 40, 46 which trail off into extended curlicues. The beads tend to string out as the paint is applied, causing deformation of the beads. Thus, both of these types of prior craft paints are unable to form the substantially uniform and homogenous, three-dimensional, discrete beads which are needed to form a design with a high quality, high visual, high resolution appearance. Moreover, because bead forming properties have not been important in craft paints, prior art paints have not been designed to have consistent viscosity across the range of a color line. In other words, when different colors of a given prior art craft paint are used to form beads, one color might be too runny while a second color might be too viscous. As a result, there are no prior art craft paints with an adequate range of colors that exhibit the beading qualities of FIG. 2 which are necessary to form attractive three-dimensional color dot matrix designs of FIG. 2.

The craft paints of the patent disclosure have the ability to create substantially uniform and homogeneously-shaped, discrete beads which give the desired color bead matrix images. These beads can be closely spaced, between about 4–9 beads per inch, without running together. Yet, each bead rounds to form a smooth, uniform bead shape. The craft paint, in order to provide this key feature, must have sufficient flow resistance so that the beads will not run together to form a continuous surface, but still have adequate fluidity to form a substantially uniform and homogeneously-shaped bead. The "balance" between these two characteristics enables the craft paint to form substantially uniform and homogeneous discrete beads. The craft paint is sufficiently fluid enough to form a substantially rounded bead, yet stable enough so as not to collapse and run together when positioned next to adjacent beads at the desired spacing S.

These key features are illustrated in FIG. 5. In FIG. 5(a), applicator 50 applies a bead 52 of the craft paint of the present invention onto surface S. As applicator 50 is withdrawn, shown in FIG. 5(b), the craft paint forms a small tail or curlicue 54 on bead 52. Tail 54 immediately begins to coalesce, as shown in FIG. 5(c), into bead 52 and the bead begins to form a smooth, rounded shape. Tail 54, within seconds, has coalesced into bead 52 to form a smooth, rounded shape, as shown in FIG. 5(d). The craft paint of the present invention forms such beads, as shown in FIG. 5(d), with substantial regularity despite various angles of application and despite the speed or technique in which the applicator is withdrawn. The present invention is not limited to the formulation of the craft paint presented below and any suitable craft paint exhibiting the characteristics discussed above could be used.

Applicant's craft paint compositions are based upon the conjunctive use of: (1) a water-based acrylic copolymer carrier fluid, (2) a high viscosity hydroxyethyl cellulose thickener, (3) a medium viscosity hydroxyethyl cellulose thickener, (4) a nonionic associative thickener and (5) an ultrafine insoluble material. In some of the most preferred embodiments of this invention, the nonionic associative thickener will be a synthetic polyurethane polymer system. Such a system contributes to the ease of flow of the craft paint out of the applicator and serves as a buffer for the two hydroxyethyl cellulose thickeners while the formulation is being stored. This blend of ingredients also contributes to formation of a craft paint which will easily flow out of the nozzle of a hand held applicator. The paint remains fluid long enough for the bead to coalesce and regularize its external surfaces in the manner depicted in FIG. 5.

Other additives also may be used under the teachings of the present invention to help give the craft paint the desired viscosity characteristics described above. It also should be noted in passing that most craft paints contain only relatively small amounts (typically 0.1 to 3% by weight) of ultrafine particles of insoluble inorganic materials to provide coloration. The craft paints of the present invention will, however, generally be characterized by their possession of such ultrafine insoluble particles, preferably mica, in amounts about twice the normal range, (i.e., about 6.0% by weight). The additional amounts of mica at least partially absorb the emulsifier in the paint to cause the paint to gel more quickly so as to form a bead. This provides the craft paint with the ability to form a smooth rounded bead regardless of the angle or rate of flow of application.

The craft paint of the present invention provides several other noteworthy features. For example, the craft paints of this patent disclosure do not remain tacky for more than a few seconds so that the craft paint design will not be disrupted by contact with other surfaces. Such craft paints also are color-fast so that the design and the surface on which it is applied can be washed or cleaned without affecting the design. Moreover, the colors of the craft paint are constant, i.e., the colors are substantially the same wet as they are dry. This allows the craft paint to be applied with confidence that the colors will remain coordinated after the craft paint has dried.

Another desirable feature of these craft paints is their ability to adhere to many different kinds of surfaces (including rough and smooth surfaces). For example, FIG. 6 illustrates the application of a craft paint bead 60 onto a fabric surface 62 having an underlying substrate 64 to form a strong adhesion to substrate 64 that will withstand repeated washing. The craft paint penetrates through surface 62 to bond 66 onto substrate 64. On the other hand, these craft paints also can be applied onto painted or vinyl surfaces, such as the flat hard surface 72 suggested in FIG. 7. That is to say that a craft paint bead 70 created by these formulations has the ability to bond 76 directly onto a flat hard surface 72 and adhere thereto. The craft paint material of the present invention creates and holds a distinctly discernable, dimensional shape sitting on top of or above the application surface, rather than creating a flat coat upon, or being absorbed into the surface as with conventional paint.

The beads after drying (usually 72 hours) permanently adhere to the surface and will not normally fall or be rubbed or scraped off in normal use and cleaning.

The more preferred embodiments of the craft paints of the present invention are provided in a variety of different colors by using a variety of pigments at different ratios and levels. Each of these different colors of craft paints require different levels of pigment or types of pigments. These different levels and/or types of pigments will affect the viscosity and beading characteristics of the craft paint. In order to get substantially the same attributes and performance for each color of craft paint, the level of the thickeners and the pearlescent pigment is adjusted. Such adjustments ensure that the beads of each color of craft paint are uniform and that the flow characteristics of each of colors of the craft paint are similar.

PREFERRED FORMULATIONS

Certain useful information concerning some of the more essential ingredients for some preferred compositions of the present invention is given in Table I below wherein, in addition to certain preferred ranges of proportions for each essential ingredient, the: (1) general functions, (2) the most preferred proportions within the preferred range of proportions, (3) the preferred types of ingredients within a class of materials (e.g., styrene acrylic copolymers as a species of acrylic copolymers) and (4) various commercial sources of these essential ingredients are listed.

TABLE I

MOST GENERAL COMPOSITION

| PREFERRED ESSENTIAL INGREDIENT | ATTRIBUTE OR FUNCTION | TRADE NAME & SUPPLIER | % WGT (wet) |
|---|---|---|---|
| Styrene Acrylic Copolymer | Vehicle or Carrier Fluid | Rhoplex WL91 Emulsion Rohm & Haas Co. | 71.7267 (range between 64.00 to 79.00) |
| Hydroxyethyl Cellulose | Thickener (High Viscosity) | QP100,000 H Union Carbide Corp. | 0.0513 (range between 0.04 to 0.06) |
| Hydroxyethyl Cellulose | Thickener (Medium Viscosity) | QP52,000H Union Carbide Corp. | .0472 (range between 0.04 to 0.06) |
| Synthetic Polyurethane Polymer System | Nonionic Associative Thickener | DSX1550 Henkel Corp. | .2266 (range between .19 to .26) |
| Mica (70%) Coated With Titanium Dioxide (30%) | Ultrafine, Insoluble Material | The Mearl Corp. | 6.4117 (range between 5.4 to 7.3) |

It also should be expressly understood that TABLE I is given by way of example only. Craft paints utilizing other ingredients can be employed and still remain within the general teachings, scope and spirit of this patent disclosure. For instance, even though TABLE I indicates that a styrene acrylic copolymer supplied by Rohm & Haas Co. is a highly preferred carrier fluid, other acrylic copolymers, such as Rhoplex AC 264 Emulsion ®, also supplied by Rohm & Haas, or a vinyl acrylic copolymer, such as Ucar 367 ®, supplied by Union Carbide, also can be employed. Similar products also are made available by BASF, Unocal, B. F. Goodrich and other chemical suppliers. In the same vein, other hydroxyethyl cellulose thickeners which can be used in the practice of this invention are supplied by Dow Chemical, Rohm & Haas, Allied Colloids, and other chemical suppliers. The pearlescent-type pigments also are supplied by EM Industries, Savannah, Ga.

As was previously noted, the essential ingredients listed in TABLE I can be augmented by the use of various optional ingredients including plain water. It also should be appreciated that such optional ingredients may serve to account for one hundred percent of the weight of a given ingredient. For example, if the recited essential ingredients only accounted for ninety percent (by weight) of the composition, then it would be understood that other optional ingredients such as water will account for the remaining ten percent of the composition and thereby serve to account for one hundred percent of the weight of the composition. Some of the most preferred optional ingredients are listed in TABLE II.

TABLE II

OPTIONAL INGREDIENTS

| INGREDIENT | ATTRIBUTE OR FUNCTION CARRIER | TRADE NAME & SUPPLIER | % WGT (wet) |
| --- | --- | --- | --- |
| Mineral Oil, Nonionic Emulsifiers, High Flash Petroleum Derivative Blend | Defoamer | Nopco NDW Henkel Corp. | .3021 (range between .27 to .33) |
| Propylene Glycol | Freeze-thaw stabilizer | Union Carbide Corp. | 7.1089 (range between 6.30 to 7.80) |
| Butyl Carbitol | Coalescent Agent | Union Carbide Corp. (premixed with Propylene Glycol) | 2.7404 (range between 2.40 to 3.00) |
| Alkoxyated Alkyphenol | Plasticizer | Paraplex WP-1 Rohm & Haas Co. | 9.8390 (range between 8.00 to 11.00) |
| 1-(3-chloroally)-3,5,7-triaza-1 azoniaadamantane sodium bicarbonate | Preservative | Dowicil 75 Dow Chemical | 3.749 (range between .33 to .41) |

These optional ingredients can be obtained from various commercial sources. For example, a wide range of defoamers in addition to the Nopco NDW ingredient indicated in TABLE II are produced by both Nopco and Colloids, Inc. Specific coalescent agents and/or plasticizers are additives which can be used for slowing the evaporation of the carrier fluid in order to allow the insoluble particles in the paint to come together. Plasticizers which can be used in applicant's craft paint formulations are produced by Monsanto, C. P. Hall and Velsicol. In any event, coalescent agents, other than those indicated in TABLE II, which can be employed in applicant's craft paint formulations include Butyl Cellosolve ®, Butyl Proposol ® and Propyl Proposol ® which are produced by Union Carbide Corporation. A tributyl phosphate agent such as that made by Eastman Chemical also can be employed for this purpose. Preservative can be added to prevent the growth of molds and bacteria growth in time paint. Such preservatives are produced by any number of chemical suppliers. Defoamers can be provided to inhibit the foaming of time binder. The freeze-thaw stabilizer ingredients of these formulations serve to provide stability and flexibility to the liquid craft paint in the event the composition is exposed to temperatures below freezing.

Coded Pattern

The present invention, in one embodiment of a pattern, provides a unique system for coded patterns which can be easily used to create designs, easily transferred to a desired surface, and easily understood by a user understanding the same color symbols. Beautiful intricate color dot matrix designs exhibiting three-dimensionality and high color saturation can be created by users in time frames an order of magnitude less than the time required to create comparable needlecraft designs. The present invention provides the user with a predefined, color coded pattern to follow as opposed to applying beads or paint randomly or creatively—no artistic talent is required for positioning or color choice.

a. Pattern Spacing

The craft paint system of the present invention provides a coding pattern to assist an individual in creating a stylized design such as design 14 in FIG. 1.

Figure 8:
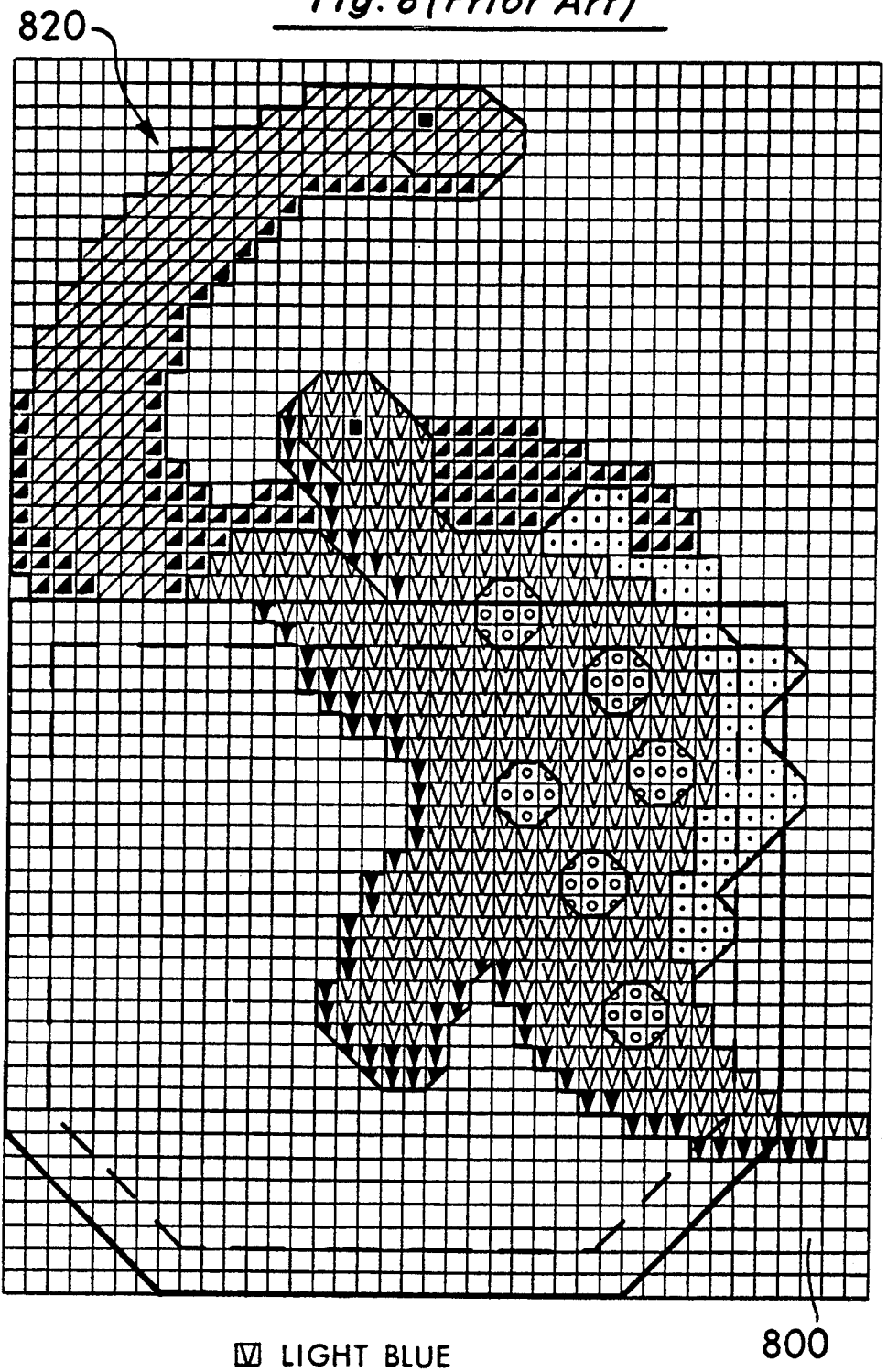
FIG. 8 sets forth a prior art coding pattern for needlepoint using square grids.

The coding patterns of the prior art, such as the coding pattern illustrated in FIG. 8, are formed in a grid array of squares 800. A chart. 810 of symbols usually accompanies each different pattern and, as mentioned, the chart may use different symbols for different colors as the pattern changes. These patterns using squares, although adequate for use with needlepoint, have a number of problems in use with craft paint. The craft paint forms a circular bead, in one approach, which is difficult to apply regularly to squares. In another approach, the craft paint is used to form beads of various geometric shapes to simulate, for example, stitches which do not relate at all to a square grid. Moreover, the total surface of the square cannot be filled without the craft paint running into the adjacent square's bead of craft paint. The extraneous background material must be carefully trimmed out of a transfer design in order not to show up on the painting surface. Curved lines can only be formed in a staggered, stairstep pattern, since squares cannot be arrayed to form a smooth curvilinear line. The entire process using these patterns is tiring. The pattern must first be sized according to the desired application. The design then must be carefully cut-out to trim off the extraneous background. In one prior art approach, the pattern must then be glued onto the application surface and left in place for at least 12 hours. This process is unpleasant for the user and detracts from the craftwork experience.

The coding patterns of the present invention, in the first approach in one embodiment, constitute an array of circles, rather than squares which are used in prior art matrix pattern crafts, such as needlepoint or cross-stitch. These circles are sized and spaced apart in a predetermined count per inch on suitable transfer material or on a desired surface.

Figure 9A:
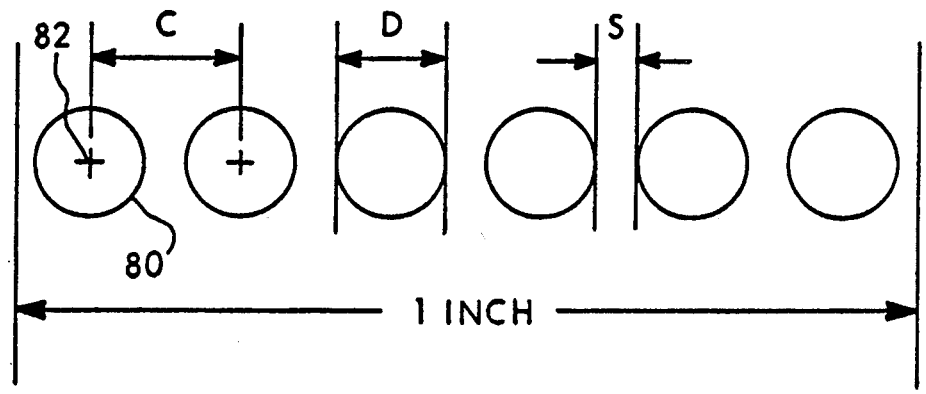
FIG. 9(a) sets forth the use of circles to create a straight line created under the teachings of the present invention.
Figure 9B:
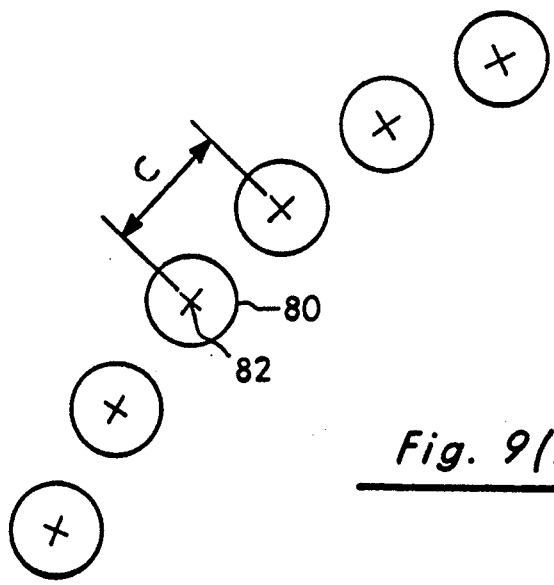
FIG. 9(b) sets forth the use of circles to create a curved line under the teachings of the present invention.
Figure 10:
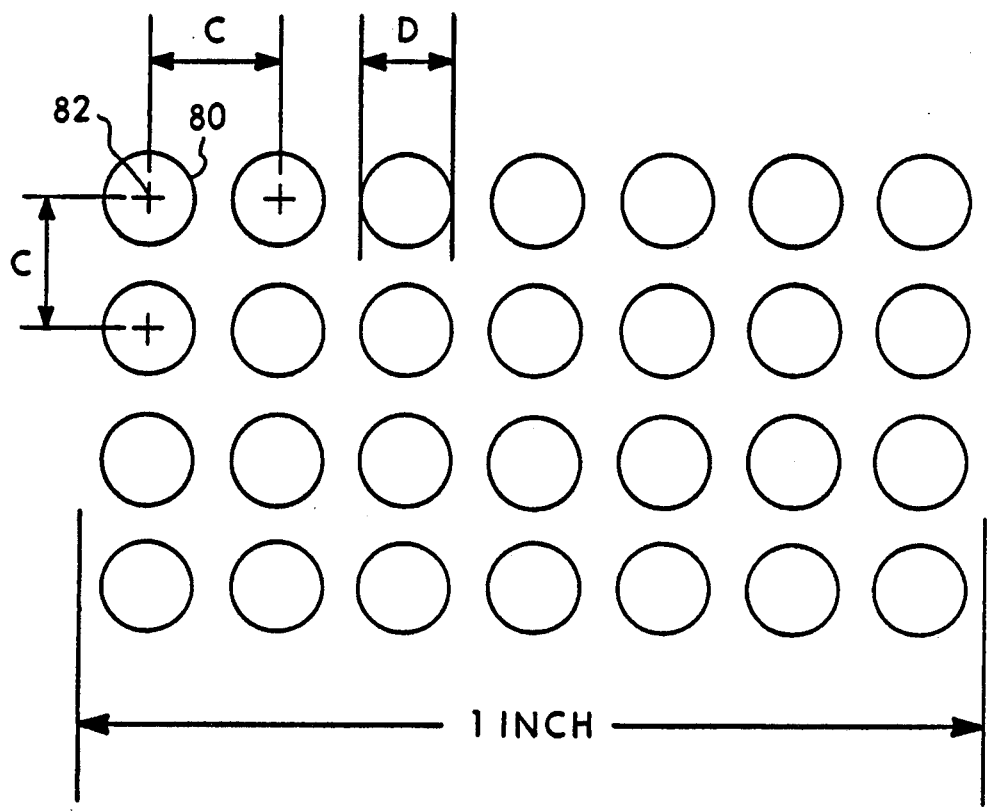
FIG. 10 sets forth the use of circles to create a regular grid under the teachings of the present invention.

The unique circles of the present invention shown in FIGS. 9–10 provide several advantages. A circle 80 provides a non-visual center point 82 for the user to clearly target the fine tip of the applicator when applying a bead of craft paint. The user points the tip of the applicator to the center 82 of the circle 80. The circles also provide a clear guide or target for the size of the bead of paint to be applied. The user continues to apply the craft paint until the circle is filled. Also, circles 80 allow a design to follow a smooth curved line as illustrated in FIG. 9(b) rather than requiring a stepped pattern as do patterns following a conventional needlecraft grid array. For example, see the stepped neck 820 of the dinosaur in FIG. 8. The circles 80 can also be spaced in a nested array (FIG. 11) rather than a grid array (FIG. 10).

In the preferred embodiment, circles 80 are spaced in a single line as shown in FIGS. 9(a) and 9(b) in a range of 4.5 to 8.5 circles per inch (as measured from center points 82 of each circle). The diameter D of each circle 80 is in a ratio to the center point spacing C of about 1/1.2 C to 1/2.4 C (or about 0.8 C to 0.4 C). For example, if the count density $C_D$, where $C_D = 1/C$, is six circles per linear inch, then the diameter of the circles would be about:ps $D=(1/1.2) (1 \text{ inch}/6)=(0.83)(0.167 \text{ inch})=0.14 \text{ inch}$ This diameter D is slightly larger than ⅛ inch. The spacing S is determined by $(1.0-C_D D)/C_D$, or C-D, which for the above example:

$S=[1.0-6(0.14)]/6=[1.0-0.84]/6=[0.16]/6=0.03$ inches

Figure 11:
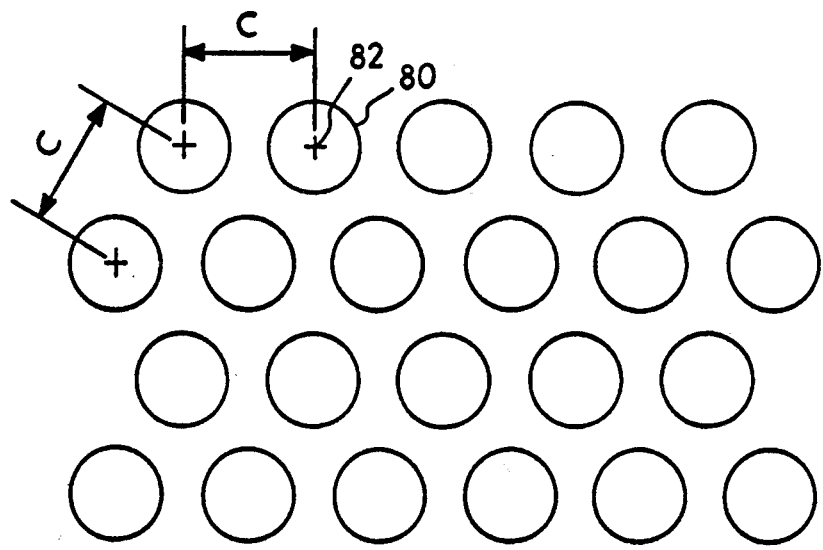
FIG. 11 sets forth circles to create a nested grid under the teachings of the present invention.

If the circles are spaced too close, the craft paint beads may tend to connect together or the beads may become so small that the design and color level become too subdued and the height dimensional look is lost. In FIG. 11, the circles 80 are nested while maintaining the spacings S. This results in a greater density than the configuration of FIG. 10. The spacing S is such that when the paint is applied the individual beads visually merge together and create sufficient color density to insure perception of the intended pattern.

The circles 80 of the present invention function to provide a vehicle for carrying a color symbol (discussed next) which provides a convenient target for centering the applicator tip. The circles when used in the above predetermined spacing and diameter relationships enable the creation of designs in patterns having straight and curved lines of painted beads and/or grids and nests of painted beads.

b. Color Symbols

Figure 13:
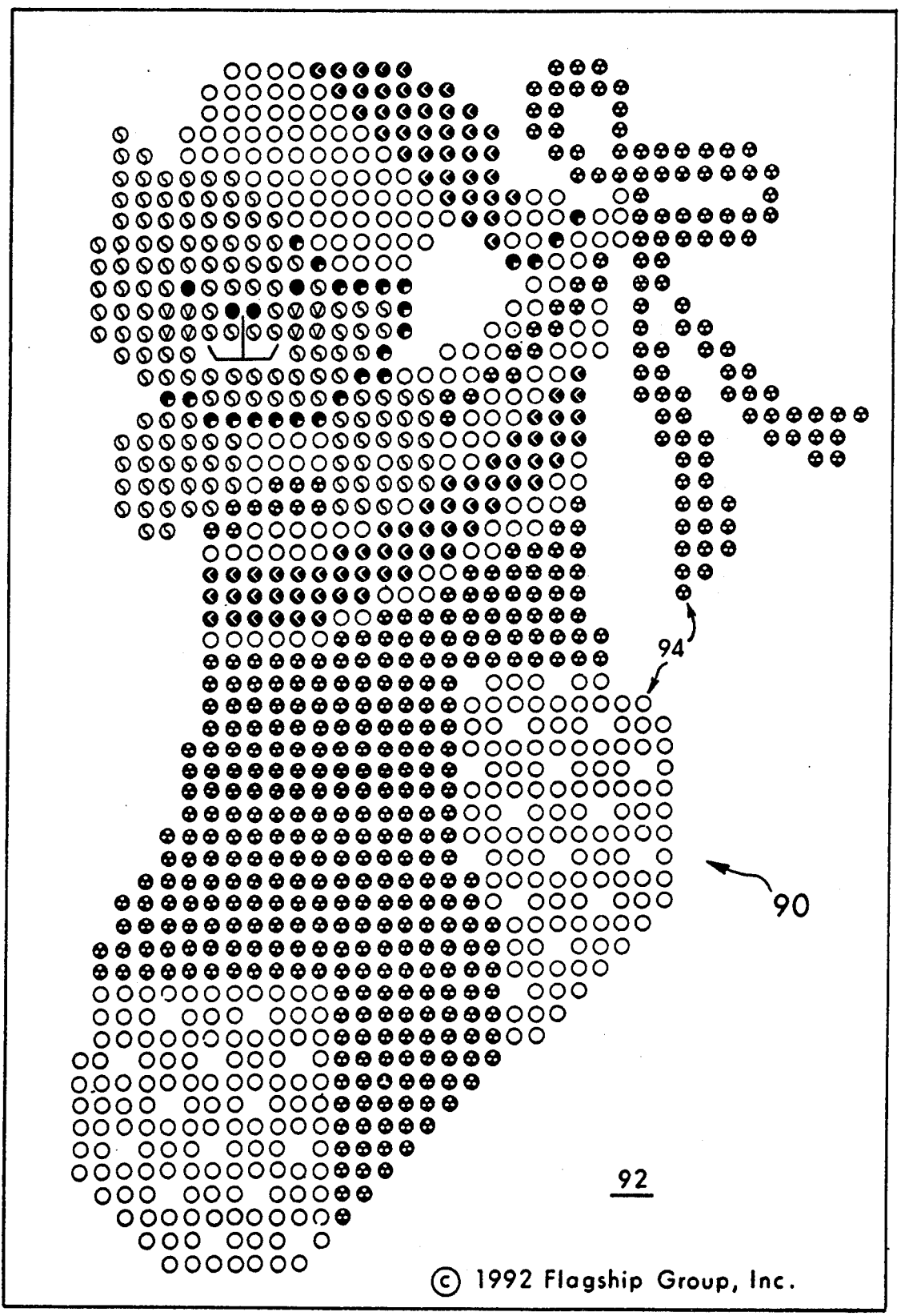
FIG. 13 sets forth the illustration of a design using the circles containing the color symbols under the teachings of the present invention.
Figure 14:
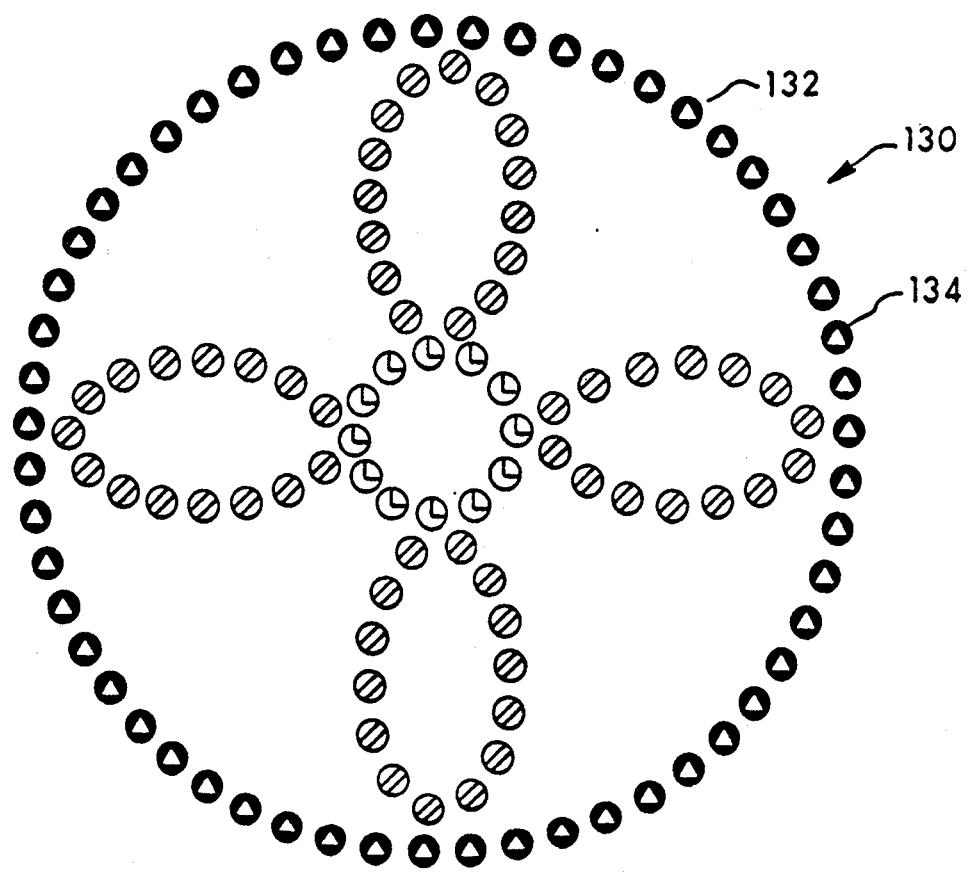
FIG. 14 sets forth a second illustration using the circles containing color symbols for a design created under the teachings of the present invention.

A unique feature of the coded patterns of the present system, in one form of the invention, is the use of a universal set of color symbols to indicate the desired colors. Each symbol always ties to the same color, so the designer and user need learn only one set of symbols. In the prior art matrix design crafts such as cross-stitch or needlepoint, new color codes are created for each design or leaflet of designs. In the present invention, each circle 80, as shown in FIGS. 12-14, is provided with a symbol 84 as to the color of craft paint to be applied in that circle. Each symbol 84 represents a specific craft paint color as illustrated in the table in FIG. 12. Moreover, each color's symbol may be provided, in another form of the invention, with a darkness value to correspond with the darkness value of the assigned color.

The symbols 84 range in darkness value according to the relative darkness of not only the different colors but also to the shades of each different color. In FIG. 12, snow white is indicated by a clear circle and black by a totally darkened circle to indicate the terminal ends of the darkness value. The symbols for the yellow colors 86 are generally lighter in contrast to the symbols for the green colors 88. Also, the symbols for each individual shade of each color have a darkness value according to the relative darkness of each shade. For instance, the symbol code 84 for Celery Green is lighter than the symbol for Forest Green.

The symbols 84 of FIG. 12 also provide another function which allows the user to better perceive the individual shades of a color by using a uniquely different design for the symbols. Many patterns will have shades of a basic color such as shades of green 88, as shown in FIG. 12. By having the different shades 88 of green represented with different designs, even though side-by-side on a pattern, the user can easily differentiate and identify the shades in a side-by-side relationship. This will be more fully discussed in the next section.

The use of the color code 84 of the present invention: (1) enables the coded design to be easily discernable, (2) enables the user to visualize the design prior to applying the craft paints, (3) provides symbol codes that are uniform, i.e, the symbol codes are the same for each design. This latter feature means that only one color coding scheme will need to be learned by the pattern designer and the user. Moreover, the symbol codes can be optionally indicated directly on the craft paint applicator bottle and packing to further aid the user.

While preferred embodiments of the invention may use circles, universal color codes, and/or color darkness values associated with the color codes, the present invention in its various forms is not so limited and the invention may use different geometric shapes, different color codes for different patterns and designs, and/or color codes not incorporating color darkness values.

c. Pattern Design

Examples of the patterns of the system of the present invention containing designs are illustrated in FIGS. 13 and 14. The pattern 90 of FIG. 13 may be printed directly onto the transfer sheet, desired surface or other media 92. Unlike prior art matrix craft patterns, the pattern 90 of the present system does not have any extraneous background grids so the transfer surface 92 will not display excess materials. The pattern 90 in FIG. 13 uses stepped circles 94 according to a grid array (FIG. 10) to simulate a needlecraft-type design. The individual circles 94 are coded to indicate colors set forth in the table of FIG. 12. The use of symbols having darkness values according to the relative darkness of the colors enables the design of a kitten in a Christmas sock to be clearly discernable.

Pattern 130, shown in FIG. 14, illustrates circles 132 arranged in smooth curvilinear lines (FIG. 9(b)). Again, there is no extraneous background material to detract from the design 130. The circles 132 are coded for the desired color to be applied. Circles 134 are coded for avocado green, etc. A user can quickly visualize the finished design 130.

It is to be expressly understood that the symbol designs 84 in FIG. 12 represent an artistic expression of the color protected by copyright laws. Any design 84 can be authored and the invention contained herein is independent of the actual artistic designs shown.

Craft Paint Applicator

Figure 15:
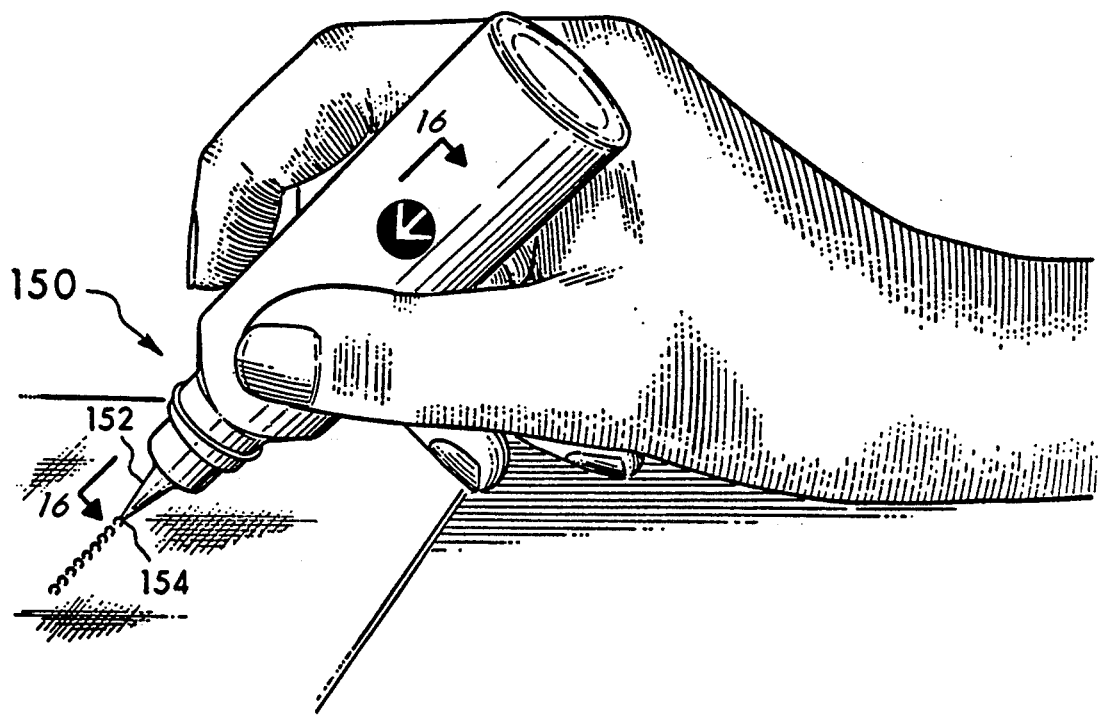
FIG. 15 sets forth the application of the craft paint of the present invention to a surface.
Figure 16:
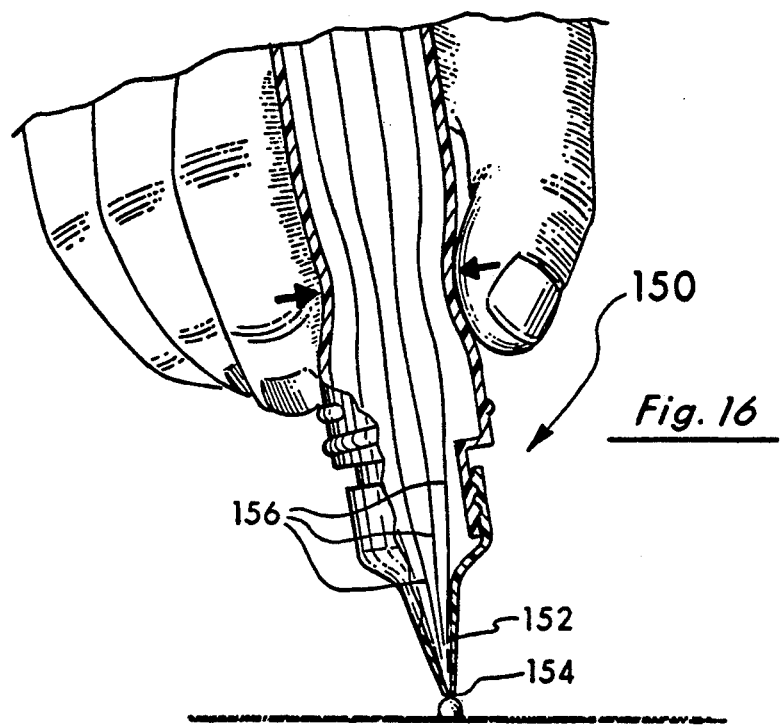
FIG. 16 sets forth, in partial cross-sectional view, the construction of the applicator bottle of the present invention.
Figure 17:
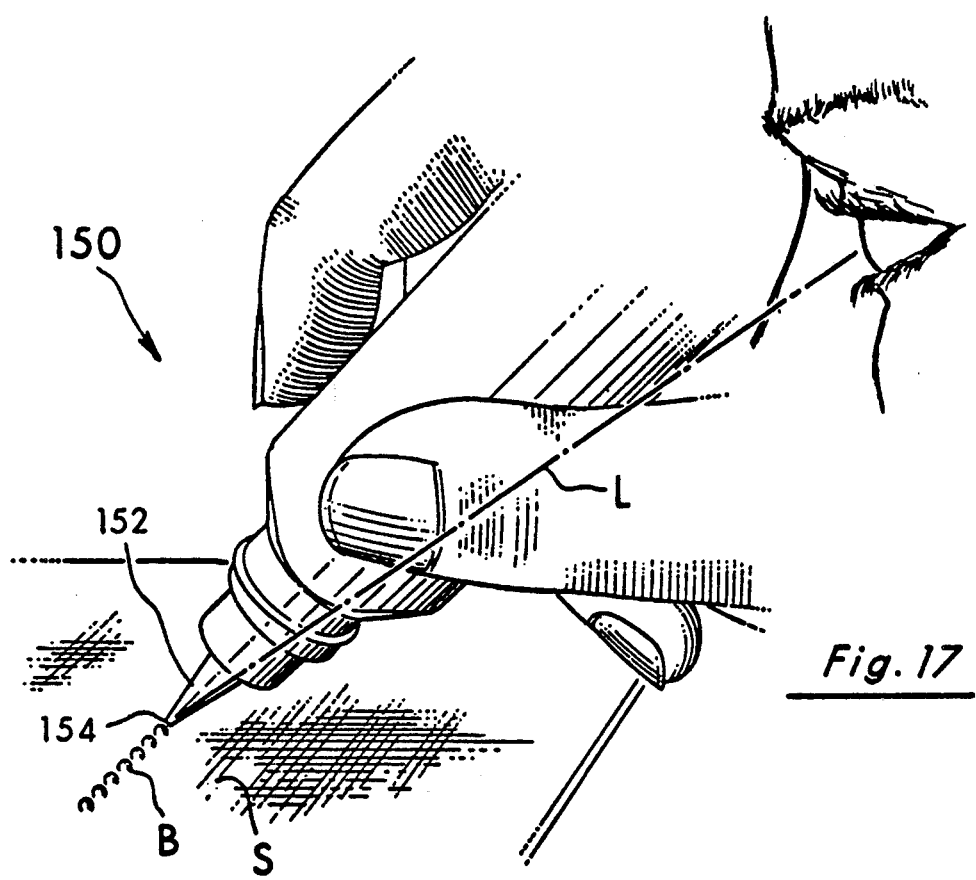
FIG. 17 illustrates the application of the beads of the present invention to a surface.

The craft paint of the present system is applied, in one form of the invention, onto the desired surface by a fine-tipped craft paint applicator, such as applicator 150 illustrated in FIGS. 15-17. In order to create the uniform, homogeneously-shaped discrete beads of paint in a specific pattern, applicator 150 has a fine tip. A fine-tipped applicator for use in this embodiment of the present system includes a tip having a dispensing end surface outside diameter less than about 0.06 inches. Conventional applicator tips having an outside diameter substantially greater than about 0.06 inches are not able to provide fine tip application. For clarification, tips having a 0.07 inch diameter would fall within the definition of fine-tip. The sidewalls of the applicator tip, in order to have an adequate inner orifice for flow purposes, are in the range of about 0.005 to 0.015 inches. These ranges provide an applicator having a sufficiently fine tip to enable a user to precisely apply the craft paint in a narrowly-spaced pattern as discussed herein. Also, the line-of-sight of the user, as indicated by line L in FIG. 17, is enhanced by the use of fine-tipped applicator 150. The user is able to directly see the target point at which the bead B from dispensing end 154 of applicator tip 152 makes contact with application surface S. The applicator of the present invention applies a fine, dimensional bead of craft paint, as opposed to a brush or sponge applicator that carries and spreads paint.

The other important features of the craft paint applicator of the present system include the formation of laminar flow 156 through the applicator tip and the minimizing of air bubbles in the craft paint flow. The fine tip 152 of craft paint applicator 150, shown in FIG. 16, in the preferred embodiment, is designed to form the craft paint in laminar flow as indicated by the flow lines 156. The applicator tip of the present invention preferably has smooth interior walls to eliminate the opportunity for turbulent flow to occur.

Figure 19:
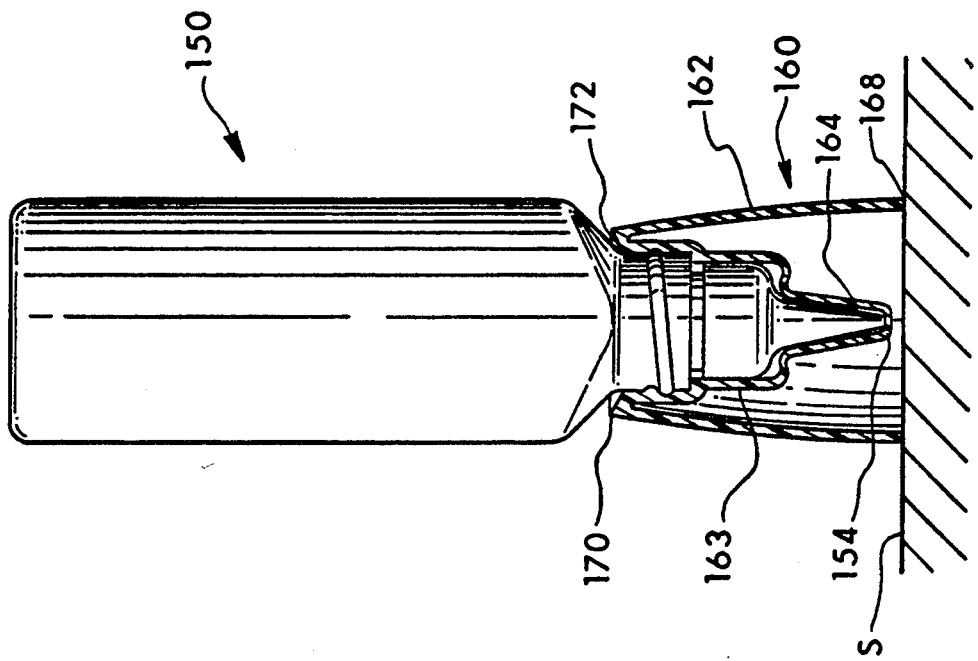
FIG. 19 illustrates a cross-sectional view of the holder of FIG. 18.
Figure 18:
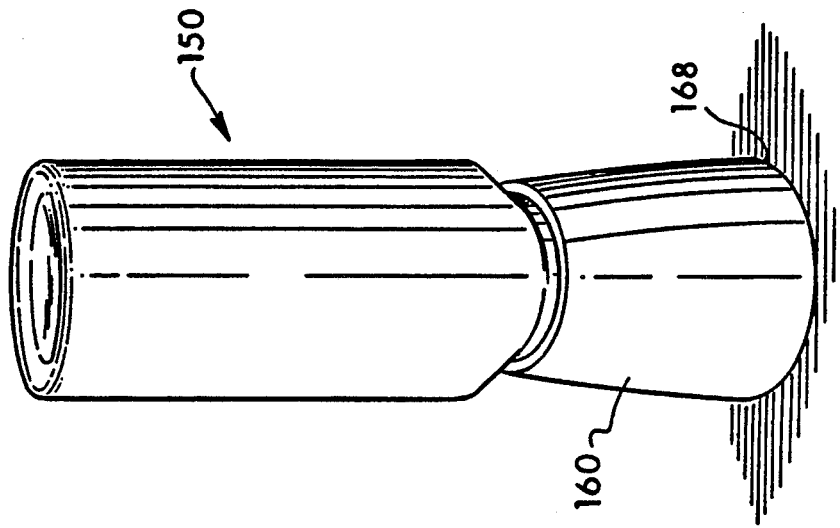
FIG. 18 illustrates the holder of the present invention for maintaining the applicator in an inverted position.

Holder 160, shown in FIGS. 18-19, includes a frusto-conical shape having an exterior wall portion 162 and inner sidewalls 164. The lower end of exterior portion 162 of cap holder 160 forms a circular base 168 to support cap holder 160 on a surface S. The upper circular end 170, shown in FIG. 19, of holder 160 includes an interior portion 172 forming a cap portion which extends downward into a formed interior cavity 163 formed by sidewalls 164.

Applicator 150 is always maintained in an inverted position by holder 160 when sold, used and stored. The craft paint is kept in fluid contact with the inner surfaces of the applicator tip by gravity flow. This prevents the formation of air pockets between the craft paint and the applicator tip. The formation of air bubbles in the craft paint is thus minimized if not eliminated. Another important benefit from the inverted position of the applicator is the prevention of air circulation within the dispensing end. Since the fluid craft paint is always in contact with the inner surfaces of the applicator tip, there is no opportunity for air to circulate within the dispensing end 154 of applicator tip. This eliminates any drying of craft paint within the applicator tip and the problems associated therewith are not present.

The inverted position of applicator 150 ensures that the applicator is always in a ready-to-use position. Since the craft paint is always in contact with the applicator tip, there is no need to wait for the craft paint to flow downward as in the prior applicators. Also, the user does not need to wait for air bubbles to dissipate in the craft paint, since there are no air bubbles present. This allows a much faster and efficient application process to speed the creation of a stylized design.

The features of a fine point applicator tip, storage and use in an inverted position provided by the cap, and the provision of laminar flow are all preferred embodiments of the present invention. It is to be understood that other structural features that functionally implement the above discussed characteristics could be implemented into the applicator of the present invention and that the invention is not to be limited by the specific approach shown in FIGS. 15-19.

Process of Using the Craft Paint System

The craft paint system of the present invention provides a process for a user, with little or no experience, or for a system to quickly and easily create a stylized color bead matrix design having a finely-detailed, three-dimensional appearance on a variety of surfaces. The system may variously use the above-described components, including the novel craft paint composition, the circle coding pattern and craft paint applicator, in combination. The process of the present invention may selectively use the universal coding scheme, the color darkness values, the fine-tip applicator, the inverted cap, and/or the other geometric shapes discussed herein.

In use, the user chooses the desired design from a selection of patterns. A designer can create a number of designs for patterns all based on the single standard set of symbols and the space circles. There is no need, as found in needlecraft, for users to learn different color symbols for different designs. The appropriate craft paints are selected according to the codes on the pattern. The pattern is transferred onto the application surface, by heat transfer or other well-known techniques. Based upon the pattern that has been transferred, the user can begin painting the design. In some applications the pattern may be printed on the desired surface. A first-time user will normally become rapidly proficient with the craft paint application with only a minimal amount of practice, typically less than an hour.

Once the pattern is transferred, the user can begin applying the beads of craft paint onto the surface. First, the user will examine the circles or geometric shapes in the area where the design is to be initiated for the explanatory color symbol. Then the craft paint applicator containing the craft paint corresponding to that code in easily selected since, as shown in FIG. 15, the color symbol may appear prominently on the side of the bottle or packaging or the user may select the applicator containing the color.

Next, the dispensing end 154 of the applicator tip of the selected craft paint applicator is targeted to the center point 82 of the circle 80 on which the craft paint is to be applied. A bead of craft paint is formed on that circle. The size of the bead is controlled by the amount and time of pressure applied against the applicator by the user's hand. The user will quickly be proficient at controlling the applicator to create the appropriate sizes of beads corresponding to the circles on the pattern. The diameter of the bead D (FIG. 2) overlays the circle 80 and symbol 84. The craft paint will forgive most discrepancies in application technique as long as the bead is the appropriate size. The user can quickly move on to the next circle to efficiently create the design. If a mistake is made, the user simply waits a few hours until the bead has partially dried but not yet cured and permanently attached and remove the mistake with tweezers or other implements.

A colorful and finely-detailed color dot matrix design can be created at a rate of several minutes per square inch, or about one-tenth the time a similar design would be created by needlecraft. This increases the aesthetic pleasure of creating the design since the design takes shape in a short period of time.

The process of the present invention is thus able to provide the items necessary for a user having little experience to create a finely-detailed design having a dimensional appearance. It is to be expressly understood that the above-described process is for explanatory purposes only. For example, the circles could be of any independent geometric shape which does not touch the adjacent shape such as octagons, hexagons, parenthesis, or in the shape of stitches as discussed herein. This feature of the present invention is illustrated in the FIGS. 20 through 31 for open and closed geometric shapes. Many other specific geometric shapes could be used beyond those illustrated.

The process of the present invention provides a series of steps which include: (1) providing a plurality of colored craft paint materials, (2) creating a pattern having a desired design, and (3) applying the paint materials with a corresponding plurality of applicators to a surface according to the pattern in discrete and substantially uniform and homogeneous beads to form the desired design in a three-dimensional color bead matrix wherein the individual beads visually merge together and create sufficient color density to insure perception of the design. The aforesaid steps could be manually implemented or automated in which case the pattern would be stored in memory and the application controlled by suitable command coordinate signals from a control. In one preferred approach, the pattern is created by the steps of (a) forming the desired design with a plurality of discretely, but closely spaced geometric shapes and (b) placing a color coded symbol in association with each shape. In another preferred approach, the color coded symbol incorporates a color darkness value to visually represent the design in the pattern.

Other Geometric Shapes

In FIGS. 20 through 27 are shown eight open geometric shapes of the present invention, in a scale of 3"=1". In other words, the geometric shapes, shown in these figures, in actual use are preferably three times smaller. These open geometric shapes are chosen under the teachings of the present invention to provide guides or targets for the use of the present invention in the application of the craft paint of the present invention onto a surface. The user targets the applicator tip in the center of the open space of the shape and applies the craft paint to the edge of the shape as will be further discussed with respect to FIG. 36. These open geometric shapes are designed to simulate threaded stitches.

Figure 20:
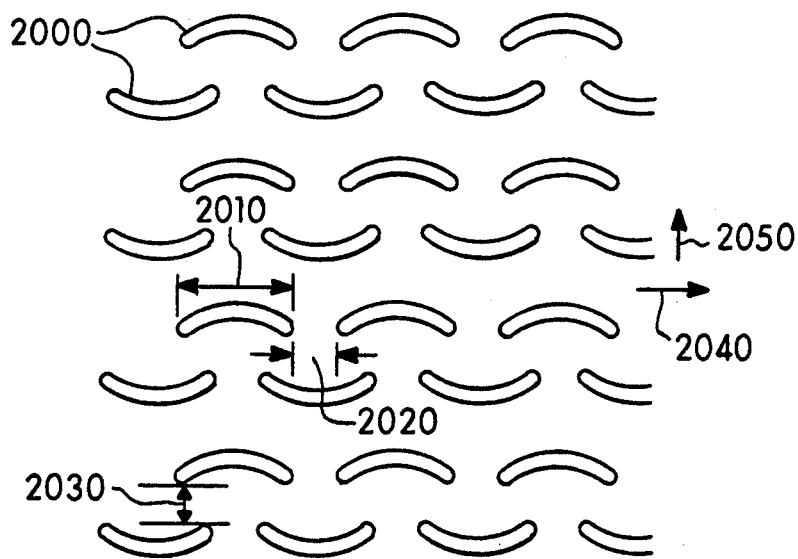
FIGS. 20 through 27 illustrate open geometric shapes for use in patterns of the present invention to simulate stitching.

In FIG. 20, the crescent stitch is simulated with a plurality of crescents 2000. In the preferred embodiment, each crescent 2000 has a length 2010 of about ¼ inch. The spacings 2020 are about 1/16th of an inch and the spacings 2030 are also about 1/16th of an inch. In the embodiment shown in FIG. 20, the crescents 2000 have a density of about 3 to 4 (preferably 3.5) crescents per inch in the length direction 2040 and about 7 to 9 (preferably 8) crescents per inch in the height direction 2050.

Figure 21:
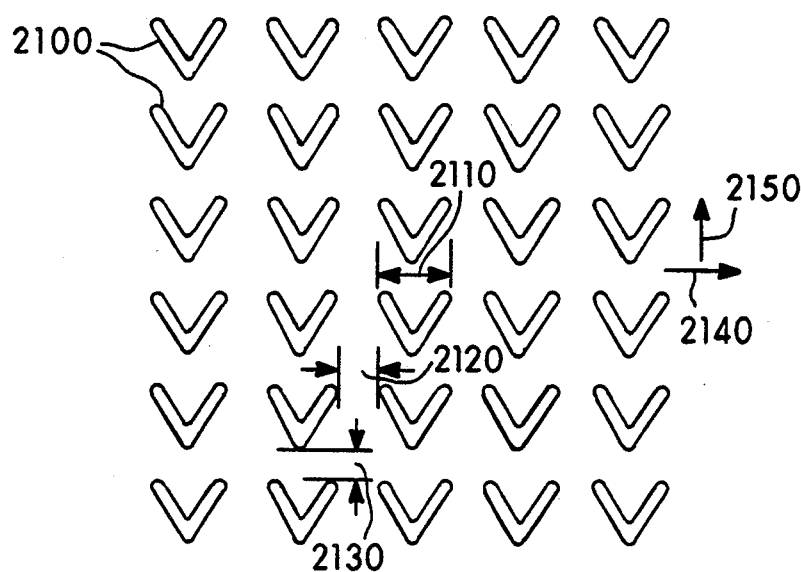

In FIG. 21, duplicate stitches 2100 are shown. The duplicate stitches have a length 2110 of about ⅛th of an inch. The height also corresponds to about ⅛th of an inch. The spacings 2120 are about 1/16th of an inch and the spacings 2130 are also 1/16th of an inch. In the height direction 2150, about 5 to 7 (preferably 6) duplicate stitches 2100 per inch are formed and in the length direction 2140 about 4 to 6 (preferably 5) duplicate stitches are shown.

Figure 22:
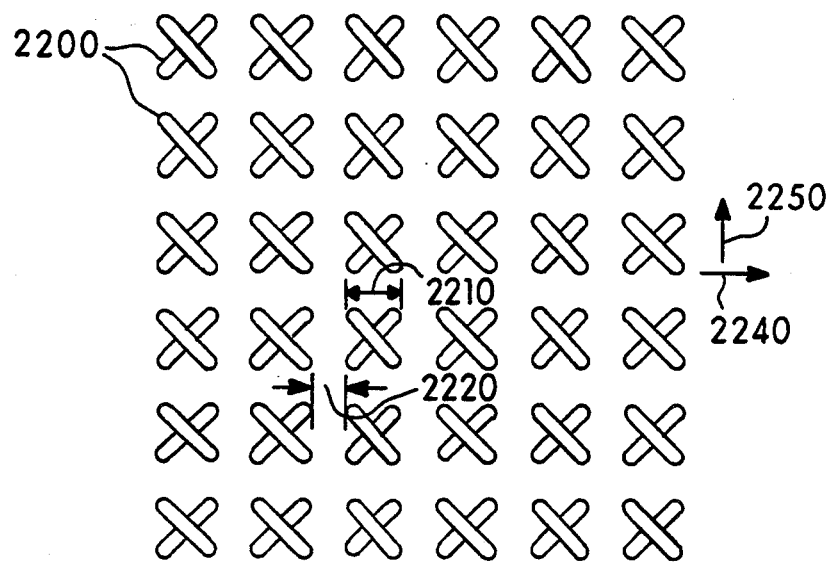

In FIG. 22, a closed-cross stitch 2200 is shown. In this embodiment, each cross stitch 2200 has a square dimension 2210 of about ⅛th inch. Each cross stitch is also spaced 2220 from the adjacent cross stitch by about 1/16th inch. Hence, in the length direction 2240 and the height direction 2250, the same number (i.e., in a range of about 5 to 7 preferably 6) of cross stitches 2200 exist.

Figure 23:
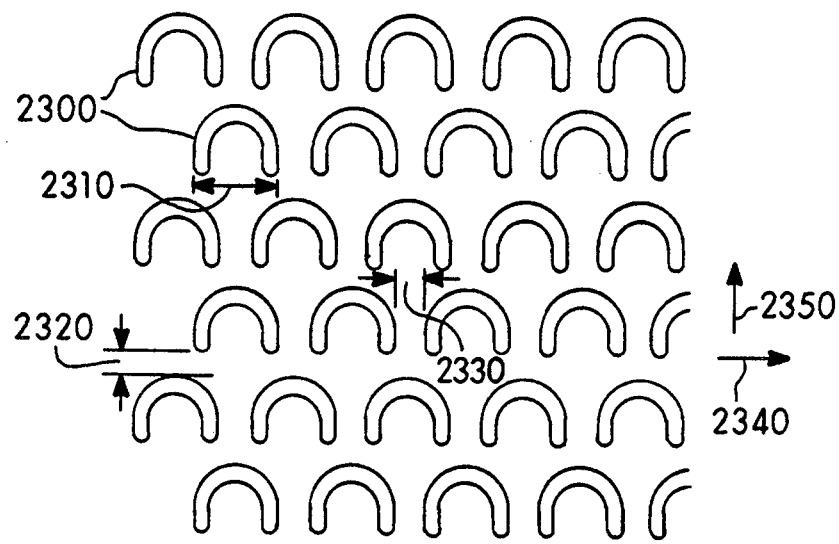

In FIG. 23, a wave stitches 2300 are shown. Each wave stitch 2300 has length 2310 slightly greater than ⅛th inch. Each spacing 2330 is about 1/16th of an inch and each spacing 2320 is less than about 1/16th of an inch. Hence, in the length direction 2340, the wave stitch 2300 are spaced in a range of about 4 to 6 (preferably 5) stitches per inch and in the height direction 2350 each wave stitch 2300 is also spaced in the range of about 5 to 7 (preferably 6) stitches per inch.

Figure 24:
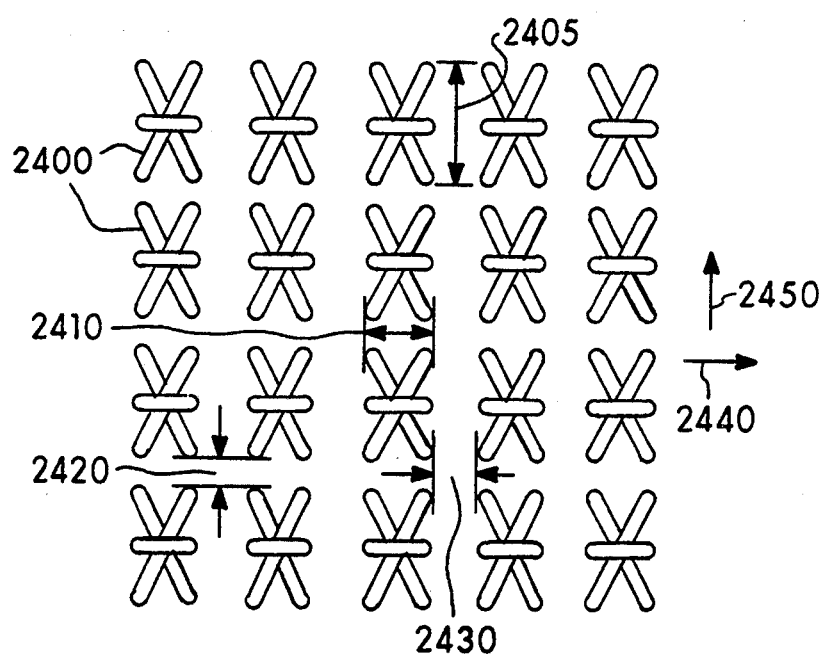

In FIG. 24, a cross-back stitch 2400 is shown. In this design, the height 2405 is about 7/32nds of an inch, the length 2410 is about ⅛th of an inch, the spacing 2420 is less than 1/16th of an inch and the spacing 2430 is greater than 1/16th of an inch. Hence, the density in the length direction 2440 is in a range of about 4 to 6 (preferably 5) cross-back stitches 2400 per inch and the density in the height direction 2450 is in a range of about 3 to 5 (preferably 4) cross-back stitches 2400 per inch.

Figure 25:
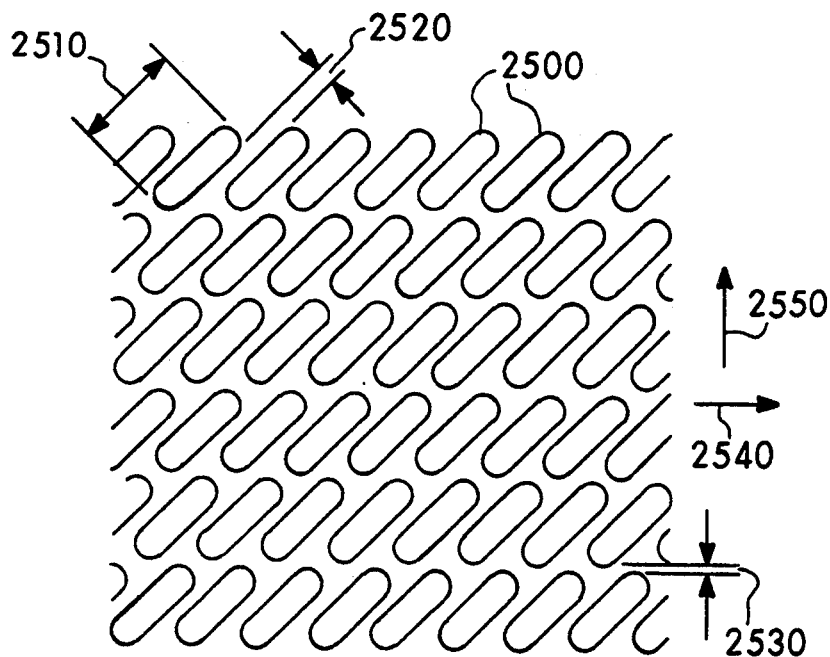

In FIG. 25, a slant stitch 2500 is shown. Each slant stitch has a length 2510 of about ⅜th of an inch. The spacings 2520 and 2530 are less than 1/16th of an inch. In the length direction 2540, the spacing range is about 8 to 10 with a preferable spacing of 9 stitches per inch and in the height direction 2550, the spacing range is about 5 to 7, preferably about 6 slant stitches per inch.

Figure 26:
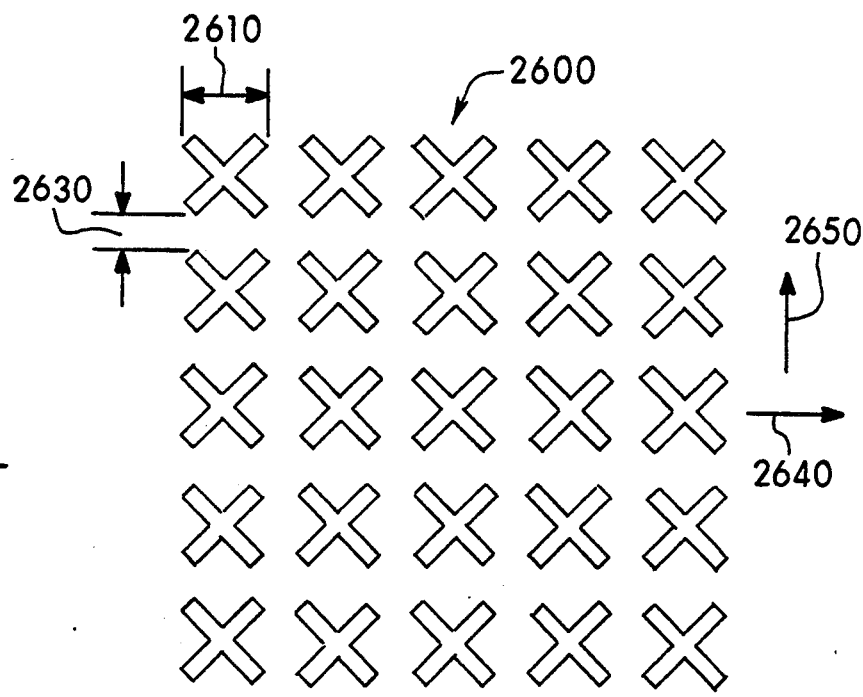
Figure 27:
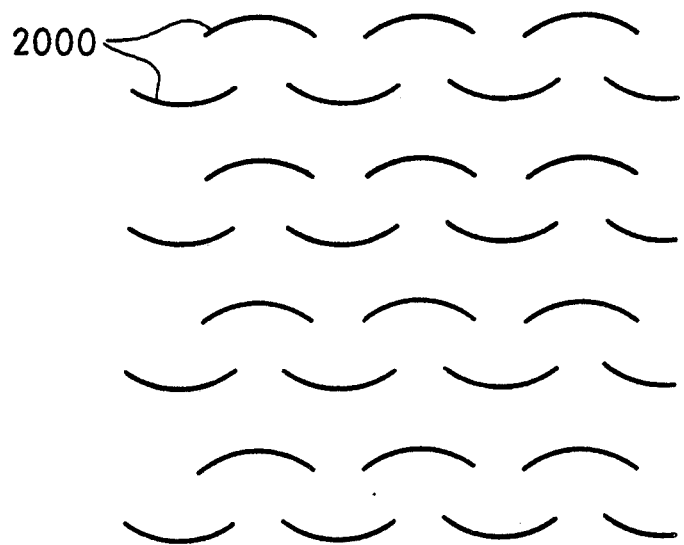
Figure 28:
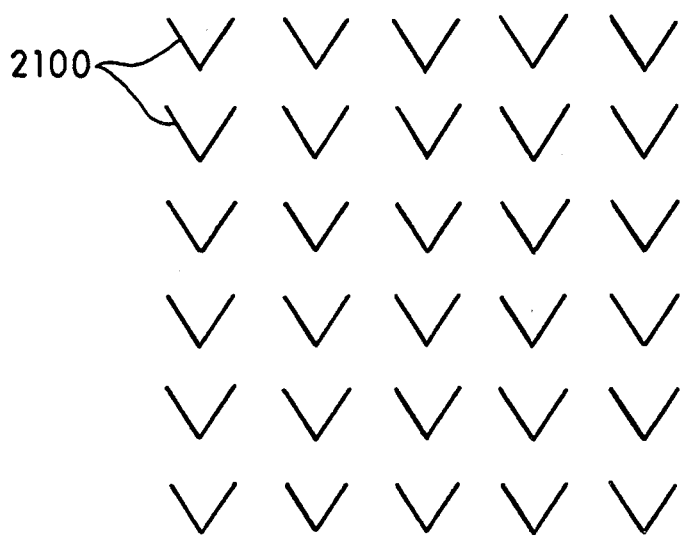
FIGS. 28 through 31 illustrate closed geometric shapes for use in patterns of the present invention to simulate stitching
Figure 29:
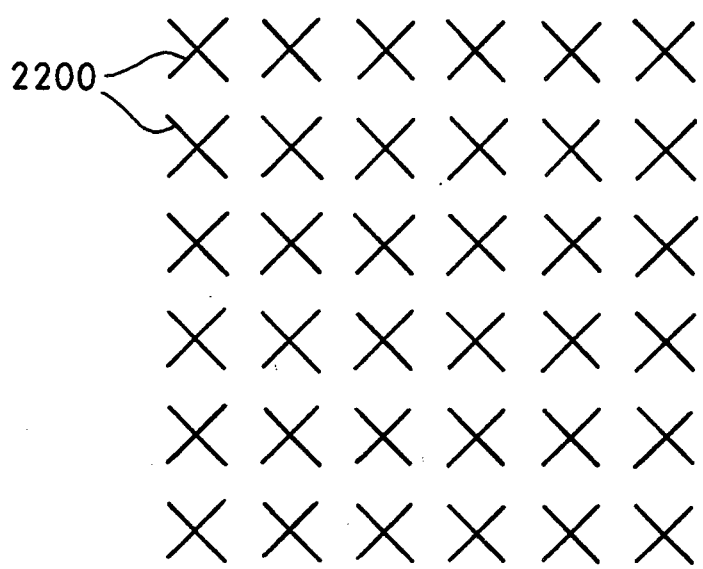

In FIG. 26, an open cross stitch 2600 is shown. Each cross stitch 2600 has a height and length 2610 of less than ⅜th inch and a spacing 2630 of about 1/16th of an inch. Hence, the open cross stitch 2600 has a density in the length direction 2640 and the height direction 2650 of 4 to 6 open cross stitches per inch, preferably 5.

The open geometric shapes shown in FIGS. 20 through 26 use precisely located geometric shapes in the style of stitches formed in matrix patterns. These shapes do not touch each other and occupy a preferred density as set forth above. The shapes illustrated are not limited to the grid arrays shown and these precisely spaced shapes may form curvilinear relationships.

FIGS. 27 through 31 show closed geometric shapes of the present invention which correspond to the open geometric shapes of FIGS. 20 through 23 and FIG. 25, respectively. These geometric shapes are essentially line drawings. The same densities are used for both the open and closed geometric shapes. The user targets the applicator tip directly over the line and applies the bead of paint to the desired thickness.

The geometric shapes shown in FIGS. 20 through 31 have a density range of about 4 to 9 shapes per inch. When the geometric shapes are circles the shapes are in a range of about 4.5 to 8.5 circles per inch as set forth above. Each geometric shape is spaced a predetermined distance from each other.

In FIGS. 32 and 33, examples of applying identifying color codes to the open geometric shapes of FIGS. 20 through 27 are shown. Codes 3200 and 3300 are simply blank to indicate the lightest color graduation. Codes 3210 and 3310 are used to indicate the darkest color. Likewise, codes 3220 through 3250 can be assigned to colors wherein the darkest color value corresponds to the code having the darkest visual value. The same is true of remaining codes 3320 through 3350 of FIG. 33. The codes shown in FIGS. 32 and 33 are representative of numerous codes that can be utilized.

Figure 30:
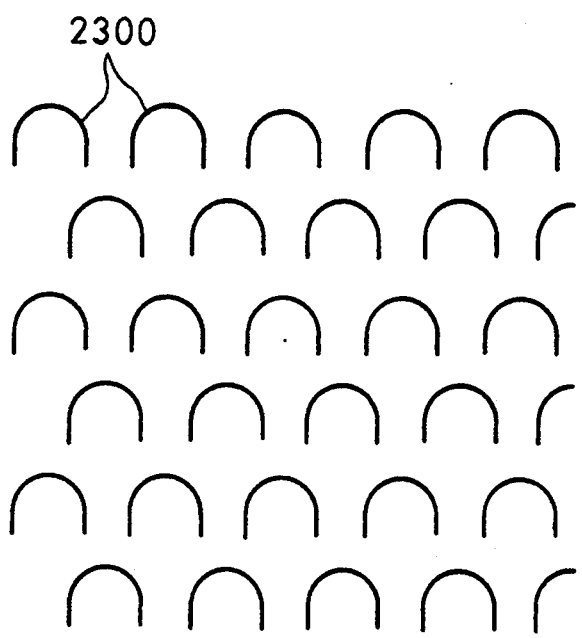
Figure 31:
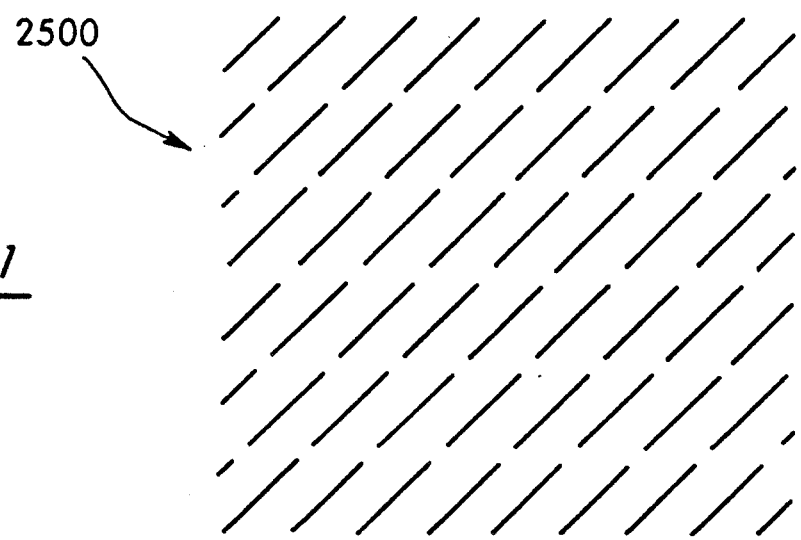
Figure 34:
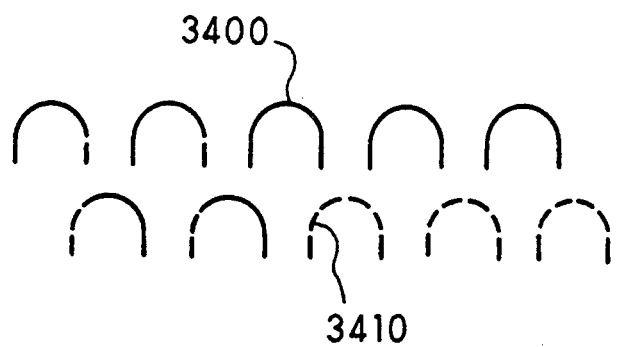
FIG. 34 illustrates the application of color codes as part of the geometric shape.

Designating color codes for the closed geometric figures of 28 through 31 is shown in FIG. 34 for the wave stitch of FIG. 30 by using dots and dashes. For example, stitch 3400 is all solid and the solid lines correspond to the darkest color. Likewise, stitch 3410 having six dots corresponds to the lightest color value. A similar dotted and dashed approach could be incorporated into the peripheral line of each open geometric shape of FIGS. 20 through 26. Hence, under this approach a unique coded line corresponding to an assigned color is an integral part of the open or closed geometric shape and provides the color darkness value.

Figure 35:
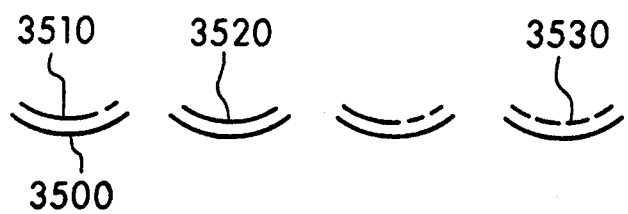
FIG. 35 illustrates the provision of the color code near the geometric shape.

It is to be understood that under the teachings of the present invention, the color code does not have to be associated within the geometric shape as shown in FIGS. 32 through 34. For example, in FIG. 35, for the crescent stitch 2000 of FIG. 20, the color code corresponding to a closed geometric shape for the crescent Figure 2000 in FIG. 27, the crescent stitch is shown as line 3500 and the color code is shown near by as 3510. The color codes correspond to the coding designations shown in FIG. 34. Hence, code 3520 is the darkest and code 3530 is the lightest color. In the situation of FIG. 35, the user would point the tip of the paint applicator in the space between the two lines (for example, line 3500 designating the cross stitch and line 3510 indicating the color). In this embodiment the color code in cooperation with the geometric shape provides a guide to the use to centrally apply the bead of paint and to indicate to the user the intended thickness. The paint would be applied so as to obliterate each line. In this embodiment, the coded line is placed near the geometric shape and conveys the color darkness value.

Hence, it is to be understood that the color symbol can be incorporated within (see FIGS. 32 and 33) the geometric shape, as part of the geometric shape (see FIG. 34) or near the geometric shape (see FIG. 35). While the above illustrations provide color symbols or codes corresponding to the color darkness value of the assigned color, any suitable symbol or code for indicating any desired color can be created under the teachings of the present invention.

Figure 36:
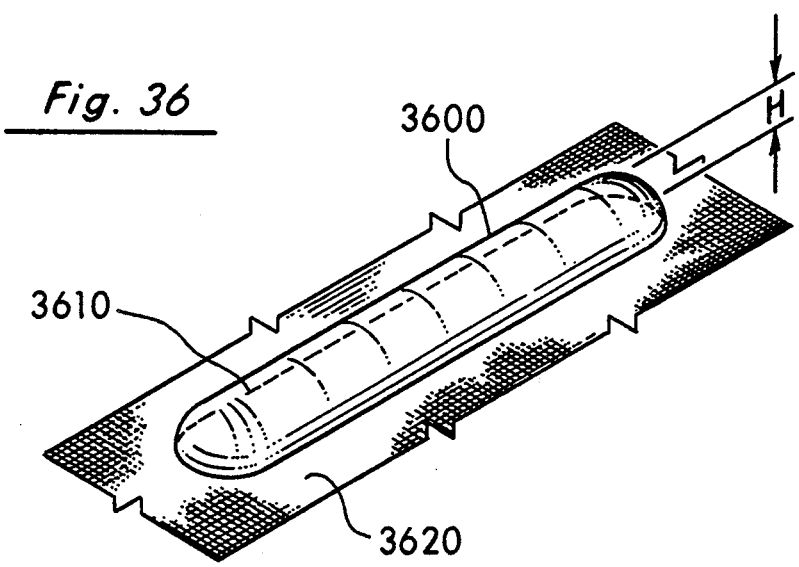
FIG. 36 illustrates the application of a uniform bead onto the shape of FIG. 31.

In FIG. 36, a bead of paint 3600 is applied with the applicator of the present invention onto a surface 3620 of material. The surface 3620 has the pattern 3610 (shown for convenience in dotted lines) of an open shape placed on the material such as by heat transfer techniques or the like. The bead 3600 of paint exhibits the same characteristics as the bead set forth in FIG. 2 for a circle and as discussed herein. The bead is a uniform shape throughout with homogeneous curved surfaces. The term "uniform" has the same meaning when applied to the bead 3600 of FIG. 36 as it does to the bead of FIG. 2. Each bead 3600 has a height "H" and is spaced from the other beads by the close spacings set forth above. The height H is substantially the same as that of adjacent beads and is generally in a desired range of approximate uniform height. The term "homogeneous" also refers to beads of the same geometric dimension. The term "discrete" also refers to the integrity of each bead without touching or blending with another bead.

Other variations and embodiments of the system, the components including the craft paint, the coding pattern and the applicator, and the process of creating the designs using such a system are considered to be within the scope of the inventive concept.

What is shown is a novel craft art system for forming a three-dimensional color bead matrix design onto a surface such as cloth. The system includes a number of colored craft paint materials contained in applications exhibiting strong adhesion for repeated washing. A pattern having an artistic design is placed onto a surface such as by heat transfer. The pattern may contain a plurality of closely spaced open and/or closed geometric shapes such as circles, hexagons, and various stitches. A color code or symbol is assigned to each different color of the colored craft paint materials and each color symbol is associated with one of the shapes. The association is by placement within the shape, near the shape or part of the shape and informs the user of the system the color identity of the craft paint material. The user then applies the craft paint material to overlay the shape and the symbol.

THE PRODUCT

The product or the present invention is illustrated in FIGS. 1, 2, 6, 7, 13, 14 and 36. The product of the present invention is the final three-dimensional bead matrix design and is the result of following the various forms of the process of the present invention and using the various forms of the system and patterns discussed herein.

The product uses a dimensional craft paint material which holds a distinctly discernable shape sitting on top of or above the application surface S as shown in FIG. 2 for bead 14, FIG. 5 for bead 52, FIG. 6 for bead 60, etc. The surface as discussed can be any suitable material. The beads are formed in the product in substantially uniform and homogeneous predetermined shape (i.e. a hemisphere in FIG. 2 or a simulated stitch in FIG. 36), the beads are formed discretely with a predetermined range of close spacings, and the beads strongly adhere to the surface so as to create a finely detailed, textured, stylized, decorative design with high resolution and color saturation. Other characteristics pertaining to the product of the present invention are set forth elsewhere herein.

It is to be expressly understood that the claimed invention is not to be limited to the description of the preferred embodiment but encompasses other modifications and alterations within the scope and spirit of the inventive concept.

We claim:

1. A craft art system for forming a three-dimensional color bead matrix design onto a surface, said craft art system comprising:

a plurality of colored craft paint materials, said craft paint materials exhibiting three-dimensionality when applied to said surface, said surface carrying a predefined, color coded pattern, said pattern having a design, said pattern comprising:

(a) a plurality of closely spaced geometric shapes forming said design, said closely spaced geometric shapes having a count density range $C_D$ of about 4 to 9 geometric shapes per inch, (b) a plurality of symbols, each of said symbols assigned to represent a different color corresponding to one of said plurality of colored craft paint materials, (c) each of said plurality of closely spaced geometric shapes associated with one of said symbols:

a plurality of applicators; each of said plurality of applicators holding one of said plurality of colored craft paint materials; each of said plurality of applicators applying said held colored craft paint material onto said surface; said craft paint material providing said three-dimensionality by forming discrete substantially uniform and homogeneous beads overlaying both of said closely spaced geometric shapes and said symbols to form said three-dimensional color bead matrix design; each said bead having substantially the same width W and height H as adjacent beads and wherein (1) said discrete substantially uniform and homogeneous beads visually merge together with sufficient color density to permit visual perception of said design, (2) said craft paint material is sufficiently fluid enough to form a substantially rounded bead that is sufficiently stable so as to preserve said discreetness of beads at said density range without collapsing and running together with adjacent beads, and (3) said beads of applied colored craft paint material after drying strongly adhere to said surface.

2. The craft art system of claim 1 wherein at least one of said closely spaced geometric shapes is an open geometric shape.

3. The craft art system of claim 2 wherein said symbol is placed within said open geometric shape.

4. The craft art system of claim 1 wherein at least one of said closely spaced geometric shapes is a closed geometric shape.

5. The craft art system of claim 4 wherein said symbol is placed near said closed geometric shape and wherein said applied colored craft paint material overlays said closed geometric shape and said placed near symbol.

6. The craft art system of claim 4 wherein said symbol is formed in said closed geometric shape.

7. The craft art system of claim 1 wherein:
each of said symbols has a darkness value corresponding to the darkness of the assigned color, and
said design in said pattern visually represented by said darkness values of said symbols associated with said plurality of closely spaced geometric shapes.

8. The craft art system of claim 1 wherein said plurality of closely spaced geometric shapes are circles having a count density range of about 4.5 to 8.5 circles per inch.

9. The craft art system of claim 1 wherein each said applicator has a fine-tip of about 0.06 inches or less.

10. The craft art system of claim 1 wherein said symbols are identical for a plurality of said designs.

11. A craft art system for forming a three-dimensional color bead matrix design onto a surface, said craft art system comprising:
a plurality of colored craft paint materials, said craft paint materials exhibiting three-dimensionality when applied to said surface,
said surface carrying a pattern, said pattern having a design, said pattern comprising:

(a) a plurality of closely spaced geometric shapes forming said design, (b) a plurality of symbols, each of said symbols assigned to represent a different color corresponding to one of said plurality of colored craft paint materials, (c) each of said plurality of closely spaced geometric shapes associated with one of said symbols, a plurality of applicators; each of said plurality of applicators holding one of said plurality of colored craft paint materials; each of said plurality of applicators applying said held colored craft paint material onto said surface; said craft paint material providing said three-dimensionality by forming substantially discrete uniform and homogeneous beads overlaying both of said closely spaced geometric shapes and said symbols to form said three-dimensional color bead matrix design; and wherein (1) said discrete substantially uniform and homogeneous beads visually merge together with sufficient color density to permit visual perception of said design, (2) said craft paint material is sufficiently fluid enough to form a substantially rounded bead that is sufficiently stable so as to preserve said discreetness of beads at a given density range without collapsing and running together with adjacent beads, and (3) said beads applied colored craft paint material after drying strongly adhere to said surface and wherein said applied colored craft paint material after drying strongly adhere to said surface.

12. The craft art system of claim 11 wherein at least one of said plurality of closely spaced geometric shapes is an open geometric shape.

13. The craft art system of claim 12 wherein said symbol is placed within said open geometric shape.

14. The craft art system of claim 11 wherein at least one of said plurality of said geometric shapes is a closed geometric shape.

15. The craft art system of claim 14 wherein said symbol is placed near said closed geometric shape and wherein said applied colored craft paint material overlays said closed geometric shape and said placed near symbol.

16. The craft art system of claim 14 wherein said symbol is formed in said closed geometric shape.

17. The craft art system of claim 11 wherein:
each of said symbols has a darkness value corresponding to the darkness of the assigned color, and
said design in said pattern visually represented by said darkness values of said symbols associated with said plurality of closely spaced geometric shapes.

18. The craft art system of claim 11 wherein said plurality of closely spaced geometric shapes are circles having a count density range of about 4.5 to 8.5 circles per inch.

19. The craft art system of claim 11 wherein each said applicator has a fine-tip of about 0.06 inches or less.

20. The craft art system of claim 11 wherein said symbols are identical for a plurality of said designs.

21. A craft art method for forming a three-dimensional color bead matrix design onto a surface, said craft art method comprising the steps of:
providing a plurality of colored craft paint materials, the craft paint materials exhibiting three-dimensionality when applied to the surface, creating a pattern having a design, the step of creating a pattern further comprising the steps of:
(a) forming the design with a plurality of closely spaced geometric shapes in a density range of about 4 to 9 geometric shapes per inch,
(b) placing one of a plurality of symbols in association with each of the closely spaced geometric shapes, each of the placed symbols representing a different color corresponding to one of the plurality of colored craft paint materials,
applying the plurality of the craft paint materials with a plurality of applicators, each of the plurality of applicators holding one of the plurality of colored craft paint materials, each of the plurality of applicators applying the held colored craft paint material onto the surface according to the pattern, the craft material providing the three-dimensionality by forming discrete substantially uniform and homogenous beads overlaying both of the closely spaced geometric shapes and the associated symbols to form the three-dimensional color bead matrix design, wherein said discrete substantially uniform and homogeneous beads visually merge together with sufficient color density to permit visual perception of said design and wherein the applied colored craft paint material after drying strongly adhering to the surface.

22. A craft art method for forming a three-dimensional color bead matrix design onto a surface, said craft art method comprising the steps of:
providing a plurality of colored craft paint materials, the craft paint materials exhibiting three-dimensionality when applied to the surface,
forming the matrix design with a plurality of closely spaced geometric shapes, each geometric shape spaced a predetermined distance from each other,
associating one of a plurality of symbols with each of the geometric shapes, each of the associated symbols assigned to a different color corresponding to one of the plurality of colored craft paint materials,
applying the plurality of the craft paint materials with a plurality of applicators, each of the plurality of applicators holding one of the plurality of colored craft paint materials, each of the plurality of applicators applying the held colored craft paint material onto the surface according to the matrix design, the craft paint material providing the three-dimensionality by forming discrete substantially uniform and homogeneous beads overlaying the closely spaced geometric shapes to form the three-dimensional color bead matrix design, wherein said discrete substantially uniform and homogeneous beads visually merge together with sufficient color density to permit visual perception of said design and wherein the applied colored craft paint material after drying strongly adhering to the surface.

23. A craft art method for forming a three-dimensional color bead design onto a surface, said craft art method comprising the steps of:
providing a plurality of colored craft paint materials, the craft paint materials exhibiting three-dimensionality when applied to the surface,
creating the design using a plurality of geometric shapes oriented in a matrix pattern, each of the geometric shapes spaced apart from each other in a predetermined range,
applying the plurality of the craft paint materials onto the surface with a plurality of applicators, each of the plurality of applicators holding one of the plurality of colored craft paint materials, each of the plurality of applicators directly applying the colored craft paint material held therein onto the surface to form the design with discrete, substantially uniform and homogeneous beads corresponding in shape to each of the geometric shapes in the design, the craft paint providing the three-dimensionality by forming said discrete substantially uniform and homogeneous beads which visually merge together to permit visual perception of the design, the applied colored craft paint material after drying strongly adhering to the surface.

24. The method of claim 23 wherein the predetermined range for geometric shapes formed in circles is about 4.5 to 8.5 circles per inch.

25. The method of claim 24 wherein the predetermined range for geometric shapes formed in the shape of stitches is about 4 to 9 stitches per inch.

26. A craft art product comprising:
a surface,
a finely detailed, textured, stylized decorative design on said surface,
at least one type of geometric shape, a plurality of said at least one type of geometric shapes forming said design, said plurality of at least one type of geometric shapes spaced from each other in a predetermined range of about 4 to 9 per inch without touching each other,
a plurality of colored craft paint materials, said plurality of colored craft paint materials on top of said surface formed in discrete substantially uniform and homogeneous three-dimensional beads corresponding in configuration to said at least one type of geometric shape, each of said beads having substantially the same width W and height H as adjacent beads, said colored craft paint materials providing a predetermined coloring to said design, said discrete substantially uniform and homogeneous three-dimensional beads visually merging together with sufficient color density to permit visual perception of said design, each of said beads, after drying, strongly adhering to said surface so as to withstand rubbing and scraping during use.

27. A craft art product comprising:
a surface,
a pattern containing a finely detailed, textured, stylized and decorative design on said surface,
a plurality of circular geometric shapes having a diameter D forming said design, said plurality of circular geometric shapes spaced from each other in a count density $C_D$ range of about 4.5 to 8.5 circles to the inch where the centerpoint spacing, C is $1/C_D$,
a plurality of colored craft paint materials, said plurality of colored craft paint materials (i) on top of said surface formed in discrete substantially uniform and homogeneous three-dimensional beads firmly adhering to said surface so as to withstand rubbing and scraping during use and (ii) corresponding in configuration to said circular geometric shape, each of said beads having a diameter D in a range of about 0.8 C to 0.4 C inches and having substantially the same height H as adjacent beads, said colored craft paint materials providing a predetermined coloring to said design, said discrete substantially uniform and homogeneous three-dimensional beads visually merging together with sufficient color density to permit visual perception of said design.

28. A craft art system for forming a dimensional color bead matrix design said craft art system comprising:
 a surface,
 a plurality of colored craft paint materials, said craft paint materials exhibiting dimensionality when applied,
 a pattern formed on said surface, said pattern having a design, said pattern having a plurality of closely spaced targets forming said design, each different type of said targets (i) representing an application point and (ii) representing a different color corresponding to one of said plurality of colored craft paint materials,
 a plurality of applicators, each of said plurality of applicators holding one of said plurality of colored craft paint materials, each of said plurality of applicators applying said held colored craft paint material directly onto to the targets corresponding to the color of said held colored craft paint material on said surface in discrete substantially uniform and homogeneous circular beads to form said dimensional color bead matrix design, said applied colored craft paint material firmly adhering to said surface so as to withstand rubbing and scraping during use, said applied circular beads having a count density $C_D$ in the range of about 4.5 to 8.5 beads per inch, a spacing C of $1/C_D$, a diameter D in the range of about 0.8 C to 0.4 C inches, substantially the same height H as adjacent beads, and a spacing S between adjacent beads in the range of about C-D inches, said applied circular beads forming a finely detailed, textured matrix that visually merges together with sufficient color density to permit visual perception of said design, said applied beads after drying strongly adhering to said surface.

29. The craft art system of claim 28 wherein each of said targets at least comprises a color symbol.

30. The craft art system of claim 28 wherein each of said targets at least comprises a geometric shape.

31. The craft art system of claim 28 wherein each said applicator has a fine-tip of about 0.06 inches or less.

32. A method of constructing a decorative article, the method comprising the steps of:
 (a) providing a surface,
 (b) providing a pattern having a predetermined decorative design formed therein, the design being formed in the pattern by a plurality of discrete geometric shapes having a count density range $C_D$ of about 4 to 9 shapes per inch,
 (c) affixing the pattern to the surface,
 (d) applying a discrete bead of colored craft paint material onto the surface to cover a selected geometric shape, the applied bead corresponding in color to the color assigned to the selected geometric shape, the applied bead of craft paint material having the shape of the selected geometric shape and further having a distinct dimensional height so that the applied bead of paint sits above the surface wherein the height of the applied bead is substantially the same as adjacent beads, the craft paint material having sufficient fluidity to form a substantially rounded bead and to maintain the spacing from an adjacent bead,
 (e) iteratively repeating step (d) for different colored craft paint materials until the predetermined decorative design is effected on the surface by the applied beads which, although discrete, visually merge together with sufficient color density to create a finely detailed and textured appearance to the predetermined decorative design,
 (f) drying the beads of applied craft paint material for a predetermined period of time so that the craft paint firmly adheres to the surface and resists scraping and rubbing off during use of the decorative article.

33. A method of constructing a stylized, decorative three dimensional color bead matrix design, the method comprising the steps of:
 (a) providing a decorative pattern containing a design by the steps of:
  (i) closely spacing a plurality of geometric shapes having a density range of about 4 to 9 geometric shapes per inch, each of the geometric shapes spaced a predetermined distance from each other based upon the density range,
  (ii) assigning each of a plurality of symbols to represent a different color, and
  (iii) associating each of the plurality of symbols with one of the spaced geometric shapes, the design in said pattern visually represented by the symbols associated with the plurality of spaced geometric shapes;
 (b) imprinting the decorative pattern onto a surface,
 (c) providing a plurality of colored dimensional craft paint materials, in colors corresponding to the colors represented by the plurality of symbols,
 (d) providing a plurality of fine tipped applicators for applying the plurality of colored craft paint materials,
 (e) selecting one of the fine tipped applicators containing craft paint material of the color corresponding to that represented by one of the plurality of symbols associated with one of the spaced geometric shapes in the pattern,
 (f) positioning the tip of said fine tipped applicator of colored craft paint material directly above one of the spaced geometric shapes associated with the symbol of the corresponding color,
 (g) applying a discrete, three-dimensional, substantially rounded bead of the colored craft paint material contained within the selected applicator to the surface in the position indicated by the spaced geometric shape in the pattern in response to the aforesaid step of positioning,
 (h) iteratively repeating steps (e) through (h) in the density range until the predetermined stylized, three dimensional color bead matrix decorative design is effected, each of the applied beads of craft paint holding a discrete rounded shape without coalescing or running together,
 (i) drying the applied beads of craft paint material in the three dimensional color bead matrix decorative design for a predetermined period of time, the dried beads of paint retaining their three-dimensional shape with the height of each bead substantially the same as adjacent beads and firmly adhering to the surface.

34. A method of constructing a stylized, decorative three dimensional color bead matrix design, the method comprising the steps of:
 (a) providing a decorative pattern containing a design by the steps of:

(i) assigning each of a plurality of targets to represent a different color, and (ii) closely spacing targets in a density range of about 4 to 9 targets per inch to form the decorative pattern, each of the targets spaced a predetermined distance from each other based upon the density range, (b) imprinting the decorative pattern onto a surface, (c) providing a plurality of colored dimensional craft paint materials, in colors corresponding to the colors represented by the plurality of targets, (d) providing a plurality of fine tipped applicators for applying the plurality of colored craft paint materials, (e) selecting one of the fine tipped applicators containing craft paint material of the color corresponding to that represented by one of the plurality of targets in the pattern, (f) positioning the tip of said fine tipped applicator of colored craft paint material directly above one of the spaced targets, (g) applying a discrete, three-dimensional, substantially rounded bead of the colored craft paint material contained within the selected applicator to the surface in the position indicated by the spaced target in the pattern in response to the aforesaid step of positioning, (h) iteratively repeating steps (e) through (h) in the density range until the predetermined stylized, three dimensional color bead matrix decorative design is effected, each of the applied beads of craft paint holding a discrete rounded shape without coalescing or running together, (i) drying the applied beads of craft paint material in the three dimensional color bead matrix decorative design for a predetermined period of time, the dried beads of paint retaining their three-dimensional shape with the height of each bead substantially the same as adjacent beads and firmly adhering to the surface.

\* \* \* \* \*